United States Patent
Quinn, Jr. et al.

(10) Patent No.: US 10,100,927 B2
(45) Date of Patent: Oct. 16, 2018

(54) CONTROLLER FOR VARIABLE TRANSMISSION

(71) Applicant: Fallbrook Intellectual Property Company LLC, Cedar Park, TX (US)

(72) Inventors: Stanley B. Quinn, Jr., Elmhurst, IL (US); Alan L. Miller, Dixon, IL (US); Scott R. Anderson, Palos Hills, IL (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

(21) Appl. No.: 14/529,773

(22) Filed: Oct. 31, 2014

(65) Prior Publication Data

US 2015/0051801 A1    Feb. 19, 2015

Related U.S. Application Data

(62) Division of application No. 12/271,611, filed on Nov. 14, 2008, now Pat. No. 8,996,263.
(Continued)

(51) Int. Cl.
*F16H 61/70* (2006.01)
*F16H 61/66* (2006.01)
(Continued)

(52) U.S. Cl.
CPC ......... *F16H 61/70* (2013.01); *F16H 61/6649* (2013.01); *F16H 37/086* (2013.01);
(Continued)

(58) Field of Classification Search
CPC .................. F16H 61/70; F16H 61/6649
See application file for complete search history.

(56) References Cited

U.S. PATENT DOCUMENTS

| | | |
|---|---|---|
| 719,595 A | 2/1903 | Huss |
| 1,121,210 A | 12/1914 | Techel |

(Continued)

FOREIGN PATENT DOCUMENTS

| | | |
|---|---|---|
| CH | 118064 | 12/1926 |
| CN | 1054340 | 9/1991 |

(Continued)

OTHER PUBLICATIONS

First Office Action dated Sep. 2, 2015 in Chinese Patent Application No. 201410145485.3.

(Continued)

*Primary Examiner* — Jelani A Smith
*Assistant Examiner* — Kelly D Williams
(74) *Attorney, Agent, or Firm* — Knobbe Martens Olson & Bear LLP

(57) ABSTRACT

An electronic controller for a variable ratio transmission and an electronically controllable variable ratio transmission including a variator or other CVT are described herein. The electronic controller can be configured to receive input signals indicative of parameters associated with an engine coupled to the transmission. The electronic controller can also receive one or more control inputs. The electronic controller can determine an active range and an active variator mode based on the input signals and control inputs. The electronic controller can control a final drive ratio of the variable ratio transmission by controlling one or more electronic solenoids that control the ratios of one or more portions of the variable ratio transmission.

16 Claims, 21 Drawing Sheets

Related U.S. Application Data

(60) Provisional application No. 60/988,560, filed on Nov. 16, 2007.

(51) Int. Cl.
*F16H 61/664* (2006.01)
*F16H 37/08* (2006.01)

(52) U.S. Cl.
CPC .. *F16H 61/6648* (2013.01); *F16H 2037/0886* (2013.01); *F16H 2061/6601* (2013.01); *Y10T 477/45* (2015.01); *Y10T 477/60* (2015.01); *Y10T 477/606* (2015.01); *Y10T 477/613* (2015.01); *Y10T 477/619* (2015.01); *Y10T 477/623* (2015.01); *Y10T 477/6242* (2015.01); *Y10T 477/62429* (2015.01); *Y10T 477/636* (2015.01); *Y10T 477/637* (2015.01); *Y10T 477/6352* (2015.01)

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielsen |
| 1,390,971 A | 9/1921 | Samain |
| 1,558,222 A | 10/1925 | Beetow |
| 1,629,092 A | 5/1927 | Arter et al. |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,131,158 A | 9/1938 | Almen et al. |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Monge |
| 2,563,370 A | 8/1951 | Reese |
| 2,586,725 A | 2/1952 | Henry |
| 2,595,367 A | 5/1952 | Picanol |
| 2,596,538 A | 5/1952 | Dicke |
| 2,597,849 A | 5/1952 | Alfredeen |
| 2,675,713 A | 4/1954 | Acker |
| 2,696,888 A | 12/1954 | Chillson et al. |
| 2,868,038 A | 5/1955 | Billeter |
| 2,716,357 A | 8/1955 | Rennerfelt |
| 2,730,904 A | 1/1956 | Rennerfelt |
| 2,748,614 A | 6/1956 | Weisel |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,035,460 A | 5/1962 | Guichard |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,207,248 A | 9/1965 | Strom |
| 3,209,606 A | 10/1965 | Yamamoto |
| 3,211,364 A | 10/1965 | Wentling et al. |
| 3,216,283 A | 11/1965 | General |
| 3,229,538 A | 1/1966 | Schlottler |
| 3,237,468 A | 3/1966 | Schlottler |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,283,614 A | 11/1966 | Hewko |
| 3,292,443 A | 12/1966 | Felix |
| 3,340,895 A | 9/1967 | Osgood, Jr. et al. |
| 3,407,687 A | 10/1968 | Hayashi |
| 3,430,504 A | 3/1969 | Dickenbrock |
| 3,439,563 A | 4/1969 | Petty |
| 3,440,895 A | 4/1969 | Fellows |
| 3,464,281 A | 9/1969 | Hiroshi et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,581,587 A | 6/1971 | Dickenbrock |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,023,442 A | 5/1977 | Woods et al. |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,186 A | 5/1983 | Cronin |
| 4,391,156 A | 7/1983 | Tibbals |
| 4,456,233 A | 6/1984 | Muller |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,501,172 A | 2/1985 | Kraus |
| 4,515,040 A | 5/1985 | Takeuchi et al. |
| 4,526,255 A | 7/1985 | Hennessey et al. |
| 4,546,673 A | 10/1985 | Shigematsu et al. |

(56) References Cited

U.S. PATENT DOCUMENTS

| | | |
|---|---|---|
| 4,560,369 A | 12/1985 | Hattori |
| 4,567,781 A | 2/1986 | Russ |
| 4,569,670 A | 2/1986 | McIntosh |
| 4,574,649 A | 3/1986 | Seol |
| 4,585,429 A | 4/1986 | Marier |
| 4,617,838 A | 10/1986 | Anderson |
| 4,630,839 A | 12/1986 | Seol |
| 4,631,469 A | 12/1986 | Tsuboi et al. |
| 4,643,048 A | 2/1987 | Hattori et al. |
| 4,651,082 A | 3/1987 | Kaneyuki |
| 4,663,990 A | 5/1987 | Itoh et al. |
| 4,700,581 A | 10/1987 | Tibbals, Jr. |
| 4,706,518 A | 11/1987 | Moroto et al. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 4,976,170 A | 12/1990 | Hayashi et al. |
| 5,006,093 A | 4/1991 | Itoh et al. |
| 5,020,384 A | 6/1991 | Kraus |
| 5,025,685 A | 6/1991 | Kobayashi et al. |
| 5,033,322 A | 7/1991 | Nakano |
| 5,033,571 A | 7/1991 | Morimoto |
| 5,037,361 A | 8/1991 | Takahashi |
| 5,044,214 A | 9/1991 | Barber |
| 5,059,158 A | 10/1991 | Bellio et al. |
| 5,069,655 A | 12/1991 | Schievelbusch |
| 5,083,982 A | 1/1992 | Sato |
| 5,099,710 A | 3/1992 | Nakano |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,166,879 A | 11/1992 | Greene et al. |
| 5,194,052 A | 3/1993 | Ueda et al. |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,269,726 A | 12/1993 | Swanson et al. |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,356,348 A | 10/1994 | Bellio et al. |
| 5,375,865 A | 12/1994 | Terry, Sr. |
| 5,379,661 A | 1/1995 | Nakano |
| 5,383,677 A | 1/1995 | Thomas |
| 5,387,000 A | 2/1995 | Sato |
| 5,401,221 A | 3/1995 | Fellows et al. |
| 5,413,540 A | 5/1995 | Streib et al. |
| 5,451,070 A | 9/1995 | Lindsay et al. |
| 5,476,019 A | 12/1995 | Cheever et al. |
| 5,489,003 A | 2/1996 | Ohyama et al. |
| 5,508,574 A | 4/1996 | Vlock |
| 5,514,047 A | 5/1996 | Tibbles et al. |
| 5,526,261 A | 6/1996 | Kallis et al. |
| 5,562,564 A | 10/1996 | Folino |
| 5,564,998 A | 10/1996 | Fellows |
| 5,601,301 A | 2/1997 | Liu |
| 5,607,373 A | 3/1997 | Ochiai et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A | 9/1997 | Muramoto et al. |
| 5,669,846 A | 9/1997 | Moroto et al. |
| 5,683,322 A | 11/1997 | Meyerle |
| 5,690,346 A | 11/1997 | Keskitalo |
| 5,701,786 A | 12/1997 | Kawakami |
| D391,824 S | 3/1998 | Larson |
| D391,825 S | 3/1998 | Larson |
| 5,722,502 A | 3/1998 | Kubo |
| 5,746,676 A | 5/1998 | Kawase et al. |
| 5,755,303 A | 5/1998 | Yamamoto et al. |
| D396,396 S | 7/1998 | Larson |
| 5,799,541 A | 9/1998 | Arbeiter |
| 5,819,864 A | 10/1998 | Koike et al. |
| 5,823,052 A | 10/1998 | Nobumoto |
| 5,823,058 A | 10/1998 | Arbeiter |
| 5,839,083 A | 11/1998 | Sugiyama |
| 5,846,155 A | 12/1998 | Taniguchi et al. |
| 5,857,387 A | 1/1999 | Larson et al. |
| 5,888,160 A | 3/1999 | Miyata et al. |
| 5,895,337 A | 4/1999 | Fellows et al. |
| 5,899,827 A | 5/1999 | Nakano et al. |
| 5,902,207 A | 5/1999 | Sugihara |
| 5,964,123 A | 10/1999 | Arbeiter |
| 5,967,933 A | 10/1999 | Valdenaire |
| 5,976,054 A | 11/1999 | Yasuoka |
| 5,984,826 A | 11/1999 | Nakano |
| 5,995,895 A | 11/1999 | Watt et al. |
| 6,000,707 A | 12/1999 | Miller |
| 6,003,649 A | 12/1999 | Fischer |
| 6,004,239 A | 12/1999 | Makino |
| 6,006,151 A | 12/1999 | Graf |
| 6,012,538 A | 1/2000 | Sonobe et al. |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,074,320 A | 6/2000 | Miyata et al. |
| 6,076,846 A | 6/2000 | Clardy |
| 6,079,726 A | 6/2000 | Busby |
| 6,083,139 A | 7/2000 | Deguchi |
| 6,085,140 A | 7/2000 | Choi |
| 6,086,506 A | 7/2000 | Petersmann et al. |
| 6,095,940 A | 8/2000 | Ai et al. |
| 6,095,945 A | 8/2000 | Graf |
| 6,099,431 A | 8/2000 | Hoge et al. |
| 6,101,895 A | 8/2000 | Yamane |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidan |
| 6,171,210 B1 | 1/2001 | Miyata et al. |
| 6,174,260 B1 | 1/2001 | Tsukada et al. |
| 6,182,000 B1 | 1/2001 | Ohta et al. |
| 6,186,922 B1 | 2/2001 | Bursal et al. |
| 6,210,297 B1 | 4/2001 | Knight |
| 6,217,473 B1 | 4/2001 | Ueda et al. |
| 6,217,478 B1 | 4/2001 | Vohmann et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,251,043 B1 | 6/2001 | Gierling |
| 6,258,003 B1 | 7/2001 | Hirano et al. |
| 6,261,200 B1 | 7/2001 | Miyata et al. |
| 6,266,931 B1 | 7/2001 | Erickson et al. |
| 6,296,593 B1 | 10/2001 | Gotou |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,174 B1 | 3/2002 | Folsom et al. |
| 6,358,178 B1 | 3/2002 | Wittkopp |

(56) References Cited

U.S. PATENT DOCUMENTS

| | | |
|---|---|---|
| 6,367,833 B1 | 4/2002 | Horiuchi |
| 6,371,878 B1 | 4/2002 | Bowen |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,440,037 B2 | 8/2002 | Takagi et al. |
| 6,449,548 B1 | 9/2002 | Jain et al. |
| 6,459,978 B2 | 10/2002 | Tamiguchi et al. |
| 6,461,268 B1 | 10/2002 | Milner |
| 6,470,252 B2 | 10/2002 | Tashiro et al. |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,513,405 B1 | 2/2003 | Stürmer et al. |
| 6,514,175 B2 | 2/2003 | Taniguchi et al. |
| 6,520,878 B1 | 2/2003 | Leclair et al. |
| 6,522,965 B1 | 2/2003 | Gierling |
| 6,532,890 B2 | 3/2003 | Chen |
| 6,551,210 B2 | 4/2003 | Miller |
| 6,558,285 B1 | 5/2003 | Sieber |
| 6,575,047 B2 | 6/2003 | Reik et al. |
| 6,588,296 B2 | 7/2003 | Wessel |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,681,652 B2 | 1/2004 | Auer et al. |
| 6,682,432 B1 | 1/2004 | Shinozuka |
| 6,684,143 B2 | 1/2004 | Graf et al. |
| 6,689,012 B2 | 2/2004 | Miller |
| 6,694,241 B2 | 2/2004 | Kim |
| 6,718,247 B1 | 4/2004 | Graf et al. |
| 6,721,637 B2 | 4/2004 | Abe et al. |
| 6,723,014 B2 | 4/2004 | Shinso et al. |
| 6,723,016 B2 | 4/2004 | Sumi |
| 6,805,654 B2 | 10/2004 | Nishii |
| 6,808,053 B2 | 10/2004 | Kirkwood et al. |
| 6,839,617 B2 | 1/2005 | Mensler et al. |
| 6,849,020 B2 | 2/2005 | Sumi |
| 6,859,709 B2 | 2/2005 | Joe et al. |
| 6,868,949 B2 | 3/2005 | Braford |
| 6,909,953 B2 | 6/2005 | Joe et al. |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,000,496 B2 | 2/2006 | Wessel et al. |
| 7,011,600 B2 | 3/2006 | Miller et al. |
| 7,011,601 B2 | 3/2006 | Miller |
| 7,011,602 B2 | 3/2006 | Makiyama et al. |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,195 B2 | 6/2006 | Berhan |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shioiri et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,383,748 B2 | 6/2008 | Rankin |
| 7,383,749 B2 | 6/2008 | Rankin |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,478,885 B2 | 1/2009 | Urabe |
| 7,481,736 B2 | 1/2009 | Miller et al. |
| 7,510,499 B2 | 3/2009 | Miller et al. |
| 7,540,818 B2 | 6/2009 | Miller et al. |

(56) References Cited

U.S. PATENT DOCUMENTS

| | | |
|---|---|---|
| 7,547,264 B2 | 6/2009 | Usoro |
| 7,574,935 B2 | 8/2009 | Rohs et al. |
| 7,591,755 B2 | 9/2009 | Petrzik et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,106 B2 | 6/2010 | Maheu et al. |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,770,674 B2 | 8/2010 | Miles et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,723 B2 | 3/2011 | Triller et al. |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,230,961 B2 | 7/2012 | Schneidewind |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,889 B2 | 2/2013 | Hoffman et al. |
| 8,376,903 B2 | 2/2013 | Pohl et al. |
| 8,382,631 B2 | 2/2013 | Hoffman et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,469,856 B2 | 6/2013 | Thomassy |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 | 8/2013 | Lohr et al. |
| 8,517,888 B1 | 8/2013 | Brookins |
| 8,535,199 B2 | 9/2013 | Lohr et al. |
| 8,550,949 B2 | 10/2013 | Miller |
| 8,585,528 B2 | 11/2013 | Carter et al. |
| 8,608,609 B2 | 12/2013 | Sherrill |
| 8,622,866 B2 | 1/2014 | Bazyn et al. |
| 8,626,409 B2 | 1/2014 | Vasiliotis et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,663,050 B2 | 3/2014 | Nichols et al. |
| 8,678,974 B2 | 3/2014 | Lohr |
| 8,708,360 B2 | 4/2014 | Miller et al. |
| 8,721,485 B2 | 5/2014 | Lohr et al. |
| 8,738,255 B2 | 5/2014 | Carter et al. |
| 8,776,633 B2 | 7/2014 | Armstrong et al. |
| 8,784,248 B2 | 7/2014 | Murakami et al. |
| 8,790,214 B2 | 7/2014 | Lohr et al. |
| 8,818,661 B2 | 8/2014 | Keilers et al. |
| 8,827,856 B1 | 9/2014 | Younggren et al. |
| 8,827,864 B2 | 9/2014 | Durack |
| 8,845,485 B2 | 9/2014 | Smithson et al. |
| 8,852,050 B2 | 10/2014 | Thomassy |
| 8,870,711 B2 | 10/2014 | Pohl et al. |
| 8,888,643 B2 | 11/2014 | Lohr et al. |
| 8,900,085 B2 | 12/2014 | Pohl et al. |
| 8,920,285 B2 | 12/2014 | Smithson et al. |
| 8,924,111 B2 | 12/2014 | Fuller |
| 8,961,363 B2 | 2/2015 | Shiina et al. |
| 8,992,376 B2 | 3/2015 | Ogawa et al. |
| 8,996,263 B2 | 3/2015 | Quinn et al. |
| 9,291,251 B2 | 3/2016 | Lohr et al. |
| 9,656,672 B2 | 5/2017 | Schieffelin |
| 2001/0008192 A1 | 7/2001 | Morisawa |
| 2001/0023217 A1 | 9/2001 | Miyagawa et al. |
| 2001/0041644 A1 | 11/2001 | Yasuoka et al. |
| 2001/0044358 A1 | 11/2001 | Taniguchi |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0037786 A1 | 3/2002 | Hirano et al. |
| 2002/0045511 A1 | 4/2002 | Geiberger et al. |
| 2002/0049113 A1 | 4/2002 | Watanabe et al. |
| 2002/0117860 A1 | 8/2002 | Man et al. |
| 2002/0128107 A1 | 9/2002 | Wakayama |
| 2002/0161503 A1 | 10/2002 | Joe et al. |
| 2002/0169051 A1 | 11/2002 | Oshidari |
| 2002/0179348 A1 | 12/2002 | Tamai et al. |
| 2002/0189524 A1 | 12/2002 | Chen |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0135316 A1 | 7/2003 | Kawamura et al. |
| 2003/0144105 A1* | 7/2003 | O'Hora ............... F16H 3/423 475/193 |
| 2003/0160420 A1 | 8/2003 | Fukuda |
| 2003/0216216 A1 | 11/2003 | Inoue et al. |
| 2003/0221892 A1 | 12/2003 | Matsumoto et al. |
| 2004/0038772 A1 | 2/2004 | McIndoe et al. |
| 2004/0051375 A1 | 3/2004 | Uno |
| 2004/0058772 A1 | 3/2004 | Inoue et al. |
| 2004/0067816 A1 | 4/2004 | Taketsuna et al. |
| 2004/0082421 A1 | 4/2004 | Wafzig |
| 2004/0087412 A1 | 5/2004 | Mori et al. |
| 2004/0092359 A1 | 5/2004 | Imanishi et al. |
| 2004/0119345 A1 | 6/2004 | Takano |
| 2004/0171457 A1 | 9/2004 | Fuller |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0064986 A1 | 3/2005 | Ginglas |
| 2005/0085979 A1* | 4/2005 | Carlson ............... F16H 61/42 701/51 |
| 2005/0181905 A1 | 8/2005 | Ali et al. |
| 2005/0184580 A1 | 8/2005 | Kuan et al. |
| 2005/0227809 A1 | 10/2005 | Bitzer et al. |
| 2005/0229731 A1 | 10/2005 | Parks et al. |
| 2005/0233846 A1 | 10/2005 | Green et al. |
| 2006/0000684 A1 | 1/2006 | Agner |
| 2006/0006008 A1 | 1/2006 | Brunemann et al. |
| 2006/0052204 A1 | 3/2006 | Eckert et al. |
| 2006/0054422 A1 | 3/2006 | Dimsey et al. |
| 2006/0108956 A1 | 5/2006 | Clark |
| 2006/0111212 A9 | 5/2006 | Ai et al. |
| 2006/0154775 A1 | 7/2006 | Ali et al. |
| 2006/0172829 A1 | 8/2006 | Ishio |
| 2006/0180363 A1 | 8/2006 | Uchisasai |

(56) References Cited

U.S. PATENT DOCUMENTS

| | | |
|---|---|---|
| 2006/0223667 A1 | 10/2006 | Nakazeki |
| 2006/0234822 A1 | 10/2006 | Morscheck et al. |
| 2006/0234826 A1 | 10/2006 | Moehlmann et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0099753 A1 | 5/2007 | Matsui et al. |
| 2007/0149342 A1 | 6/2007 | Guenter et al. |
| 2007/0155552 A1 | 7/2007 | De Cloe |
| 2007/0155567 A1 | 7/2007 | Miller et al. |
| 2007/0193391 A1 | 8/2007 | Armstrong et al. |
| 2007/0228687 A1 | 10/2007 | Parker |
| 2007/0232423 A1* | 10/2007 | Katou ............. F16H 61/66272 474/28 |
| 2008/0009389 A1 | 1/2008 | Jacobs |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0149407 A1 | 6/2008 | Shibata et al. |
| 2008/0183358 A1 | 7/2008 | Thomson et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |
| 2009/0251013 A1 | 10/2009 | Vollmer et al. |
| 2010/0093479 A1 | 4/2010 | Carter et al. |
| 2010/0145573 A1 | 6/2010 | Vasilescu |
| 2010/0181130 A1 | 7/2010 | Chou |
| 2011/0127096 A1 | 6/2011 | Schneidewind |
| 2011/0230297 A1 | 9/2011 | Shiina et al. |
| 2011/0237385 A1 | 9/2011 | Andre Parise |
| 2011/0291507 A1 | 12/2011 | Post |
| 2011/0319222 A1 | 12/2011 | Ogawa et al. |
| 2012/0035011 A1 | 2/2012 | Menachem et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0095977 A1 | 4/2013 | Smithson et al. |
| 2013/0146406 A1 | 6/2013 | Nichols et al. |
| 2013/0152715 A1 | 6/2013 | Pohl et al. |
| 2013/0190123 A1 | 7/2013 | Pohl et al. |
| 2013/0288848 A1 | 10/2013 | Carter et al. |
| 2013/0310214 A1 | 11/2013 | Pohl et al. |
| 2013/0324344 A1 | 12/2013 | Pohl et al. |
| 2013/0337971 A1 | 12/2013 | Kostrup |
| 2014/0011619 A1 | 1/2014 | Pohl et al. |
| 2014/0038771 A1 | 2/2014 | Miller |
| 2014/0073470 A1 | 3/2014 | Carter et al. |
| 2014/0121922 A1 | 5/2014 | Vasiliotis et al. |
| 2014/0128195 A1 | 5/2014 | Miller et al. |
| 2014/0141919 A1 | 5/2014 | Bazyn et al. |
| 2014/0144260 A1 | 5/2014 | Nichols et al. |
| 2014/0148303 A1 | 5/2014 | Nichols et al. |
| 2014/0179479 A1 | 6/2014 | Nichols et al. |
| 2014/0206499 A1 | 7/2014 | Lohr |
| 2014/0248988 A1 | 9/2014 | Lohr et al. |
| 2014/0257650 A1 | 9/2014 | Carter et al. |
| 2014/0274536 A1 | 9/2014 | Versteyhe |
| 2014/0323260 A1 | 10/2014 | Miller et al. |
| 2014/0329637 A1 | 11/2014 | Thomassy et al. |
| 2014/0335991 A1 | 11/2014 | Lohr et al. |
| 2014/0365059 A1 | 12/2014 | Keilers et al. |
| 2015/0018154 A1 | 1/2015 | Thomassy |
| 2015/0039195 A1 | 2/2015 | Pohl et al. |
| 2015/0080165 A1 | 3/2015 | Pohl et al. |
| 2015/0226323 A1 | 8/2015 | Pohl et al. |
| 2015/0233473 A1 | 8/2015 | Miller et al. |
| 2015/0260284 A1 | 9/2015 | Miller et al. |
| 2015/0337928 A1 | 11/2015 | Smithson |
| 2015/0345599 A1 | 12/2015 | Ogawa |
| 2015/0369348 A1 | 12/2015 | Nichols et al. |
| 2015/0377305 A1 | 12/2015 | Nichols et al. |
| 2016/0003349 A1 | 1/2016 | Kimura et al. |
| 2016/0031526 A1 | 2/2016 | Watarai |
| 2016/0040763 A1 | 2/2016 | Nichols et al. |
| 2016/0061301 A1 | 3/2016 | Bazyn et al. |
| 2016/0131231 A1 | 5/2016 | Carter et al. |
| 2016/0146342 A1 | 5/2016 | Vasiliotis et al. |
| 2016/0178037 A1 | 6/2016 | Pohl |
| 2016/0186847 A1 | 6/2016 | Nichols et al. |
| 2016/0201772 A1 | 7/2016 | Lohr et al. |
| 2016/0244063 A1 | 8/2016 | Carter et al. |
| 2016/0273627 A1 | 9/2016 | Miller et al. |
| 2016/0281825 A1 | 9/2016 | Lohr et al. |
| 2016/0290451 A1 | 10/2016 | Lohr |
| 2016/0298740 A1 | 10/2016 | Carter et al. |
| 2016/0347411 A1 | 12/2016 | Yamamoto et al. |
| 2016/0362108 A1 | 12/2016 | Keilers et al. |
| 2017/0072782 A1 | 3/2017 | Miller et al. |
| 2017/0082049 A1 | 3/2017 | David et al. |
| 2017/0103053 A1 | 4/2017 | Nichols et al. |
| 2017/0159812 A1 | 6/2017 | Pohl et al. |
| 2017/0163138 A1 | 6/2017 | Pohl |
| 2017/0204948 A1 | 7/2017 | Thomassy et al. |
| 2017/0204969 A1 | 7/2017 | Thomassy et al. |
| 2017/0211698 A1 | 7/2017 | Lohr |
| 2017/0268638 A1 | 9/2017 | Nichols et al. |
| 2017/0274903 A1 | 9/2017 | Carter et al. |
| 2017/0276217 A1 | 9/2017 | Nichols et al. |
| 2017/0284519 A1 | 10/2017 | Kolstrup |
| 2017/0284520 A1 | 10/2017 | Lohr et al. |
| 2017/0314655 A1 | 11/2017 | Miller et al. |

FOREIGN PATENT DOCUMENTS

| | | |
|---|---|---|
| CN | 2245830 | 1/1997 |
| CN | 1157379 | 8/1997 |
| CN | 1167221 | 12/1997 |
| CN | 1178573 | 4/1998 |
| CN | 1178751 | 4/1998 |
| CN | 1204991 | 1/1999 |
| CN | 1283258 | 2/2001 |
| CN | 1300355 | 6/2001 |
| CN | 1412033 | 4/2003 |
| CN | 1434229 | 8/2003 |
| CN | 1474917 | 2/2004 |
| CN | 1483235 | 3/2004 |
| CN | 1568407 | 1/2005 |
| CN | 1654858 | 8/2005 |
| CN | 2714896 | 8/2005 |
| CN | 1736791 | 2/2006 |
| CN | 1847702 | 10/2006 |
| CN | 1860315 | 11/2006 |
| CN | 1940348 | 4/2007 |
| CN | 101016076 | 8/2007 |
| DE | 498 701 | 5/1930 |
| DE | 1171692 | 6/1964 |
| DE | 2021027 | 12/1970 |
| DE | 2 310880 | 9/1974 |
| DE | 2 136 243 | 1/1975 |
| DE | 2436496 | 2/1975 |
| DE | 39 40 919 A1 | 6/1991 |
| DE | 4120540 C1 | 11/1992 |
| DE | 19851738 | 5/2000 |
| DE | 10155372 | 5/2003 |
| DE | 10261372 A1 | 7/2003 |
| DE | 102011016672 | 10/2012 |
| DE | 102012023551 | 6/2014 |
| DE | 102014007271 | 12/2014 |
| EP | 0 432 742 | 12/1990 |
| EP | 0 528 381 | 2/1993 |
| EP | 0 528 382 | 2/1993 |
| EP | 0 635 639 | 1/1995 |
| EP | 0 638 741 | 2/1995 |
| EP | 0 831 249 | 3/1998 |
| EP | 0 832 816 | 4/1998 |

(56) References Cited

FOREIGN PATENT DOCUMENTS

| | | |
|---|---|---|
| EP | 0 976 956 | 2/2000 |
| EP | 1 010 612 | 6/2000 |
| EP | 1 136 724 | 9/2001 |
| EP | 1 251 294 | 10/2002 |
| EP | 1 366 978 | 3/2003 |
| EP | 1 362 783 | 11/2003 |
| EP | 1 433 641 | 6/2004 |
| EP | 1 452 441 | 9/2004 |
| EP | 1 518 785 | 3/2005 |
| EP | 1 624 230 | 2/2006 |
| EP | 2 893 219 | 7/2015 |
| FR | 620375 | 4/1927 |
| FR | 2460427 | 1/1981 |
| FR | 2590638 | 5/1987 |
| GB | 391448 | 4/1933 |
| GB | 592320 | 9/1947 |
| GB | 906002 | 9/1962 |
| GB | 919430 | 2/1963 |
| GB | 1132473 | 11/1968 |
| GB | 1165545 | 10/1969 |
| GB | 1376057 | 12/1974 |
| GB | 2031822 | 4/1980 |
| GB | 2035481 | 6/1980 |
| GB | 2035482 | 6/1980 |
| GB | 2080452 | 8/1982 |
| JP | 38-025315 | 11/1963 |
| JP | 41-3126 | 2/1966 |
| JP | 42-2843 | 2/1967 |
| JP | 42-2844 | 2/1967 |
| JP | 44-1098 | 1/1969 |
| JP | 47-000448 | 1/1972 |
| JP | 47-207 | 6/1972 |
| JP | 47-20535 | 6/1972 |
| JP | 47-00962 | 11/1972 |
| JP | 47-29762 | 11/1972 |
| JP | 48-54371 | 7/1973 |
| JP | 49-12742 | 3/1974 |
| JP | 49-012742 | 3/1974 |
| JP | 49-013823 | 4/1974 |
| JP | 49-041536 | 11/1974 |
| JP | 50-114581 | 9/1975 |
| JP | 51-25903 | 8/1976 |
| JP | 51-150380 | 12/1976 |
| JP | 52-35481 | 3/1977 |
| JP | 53-048166 | 1/1978 |
| JP | 55-135259 | 10/1980 |
| JP | 56-24251 | 3/1981 |
| JP | 56-047231 | 4/1981 |
| JP | 56-101448 | 8/1981 |
| JP | 56-127852 | 10/1981 |
| JP | 58-065361 | 4/1983 |
| JP | 59-069565 | 4/1984 |
| JP | 59-144826 | 8/1984 |
| JP | 59-190557 | 10/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-125854 | 5/1988 |
| JP | 63-219953 | 9/1988 |
| JP | 63-160465 | 10/1988 |
| JP | 01-039865 | 11/1989 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 02-182593 | 7/1990 |
| JP | 03-149442 | 6/1991 |
| JP | 03-223555 | 10/1991 |
| JP | 04-166619 | 6/1992 |
| JP | 04-272553 | 9/1992 |
| JP | 04-327055 | 11/1992 |
| JP | 04-351361 | 12/1992 |
| JP | 05-087154 | 4/1993 |
| JP | 06-050169 | 2/1994 |
| JP | 06-050358 | 2/1994 |
| JP | 07-42799 | 2/1995 |
| JP | 07-133857 | 5/1995 |
| JP | 07-139600 | 5/1995 |
| JP | 07-259950 | 10/1995 |
| JP | 08-135748 | 5/1996 |
| JP | 08-170706 | 7/1996 |
| JP | 08-247245 | 9/1996 |
| JP | 08-270772 | 10/1996 |
| JP | 09-024743 | 1/1997 |
| JP | 09-089064 | 3/1997 |
| JP | 10-061739 | 3/1998 |
| JP | 10-078094 | 3/1998 |
| JP | 10-089435 | 4/1998 |
| JP | 10-115355 | 5/1998 |
| JP | 10-115356 | 5/1998 |
| JP | 10-194186 | 7/1998 |
| JP | 10-225053 | 8/1998 |
| JP | 10-511621 | 11/1998 |
| JP | 11-063130 | 3/1999 |
| JP | 11-091411 | 4/1999 |
| JP | 11-210850 | 8/1999 |
| JP | 11-240481 | 9/1999 |
| JP | 11-257479 | 9/1999 |
| JP | 2000-6877 | 1/2000 |
| JP | 2000-46135 | 2/2000 |
| JP | 2000-177673 | 6/2000 |
| JP | 2001-027298 | 1/2001 |
| JP | 2001-071986 | 3/2001 |
| JP | 2001-107827 | 4/2001 |
| JP | 2001-165296 | 6/2001 |
| JP | 2001-234999 | 8/2001 |
| JP | 2001-328466 | 11/2001 |
| JP | 2002-147558 | 5/2002 |
| JP | 2002-250421 | 6/2002 |
| JP | 2002-291272 | 10/2002 |
| JP | 2002-307956 | 10/2002 |
| JP | 2002-533626 | 10/2002 |
| JP | 2002-372114 | 12/2002 |
| JP | 2003-028257 | 1/2003 |
| JP | 2003-56662 | 2/2003 |
| JP | 2003-161357 | 6/2003 |
| JP | 2003-194206 | 7/2003 |
| JP | 2003-194207 | 7/2003 |
| JP | 2003-320987 | 11/2003 |
| JP | 2003-336732 | 11/2003 |
| JP | 2004-011834 | 1/2004 |
| JP | 2004-38722 | 2/2004 |
| JP | 2004-162652 | 6/2004 |
| JP | 2004-189222 | 7/2004 |
| JP | 2004-526917 | 9/2004 |
| JP | 2004-301251 | 10/2004 |
| JP | 2005-003063 | 1/2005 |
| JP | 2005-096537 | 4/2005 |
| JP | 2005-188694 | 7/2005 |
| JP | 2005-240928 | 9/2005 |
| JP | 2005-312121 | 11/2005 |
| JP | 2006-015025 | 1/2006 |
| JP | 2006-283900 | 10/2006 |
| JP | 2006-300241 | 11/2006 |
| JP | 2007-085404 | 4/2007 |
| JP | 2007-321931 | 12/2007 |
| JP | 2008-002687 | 1/2008 |
| JP | 2008-133896 | 6/2008 |
| JP | 2010-069005 | 4/2010 |
| JP | 2012-225390 | 11/2012 |
| JP | 2015-227690 | 12/2015 |
| JP | 2015-227691 | 12/2015 |
| KR | 2002 0054126 | 7/2002 |
| KR | 10-2002-0071699 | 9/2002 |
| NE | 98467 | 7/1961 |
| TW | 74007 | 1/1984 |
| TW | 175100 | 12/1991 |
| TW | 218909 | 1/1994 |
| TW | 227206 | 7/1994 |

(56) References Cited

FOREIGN PATENT DOCUMENTS

| | | |
|---|---|---|
| TW | 275872 | 5/1996 |
| TW | 360184 | 6/1999 |
| TW | 366396 | 8/1999 |
| TW | 401496 | 8/2000 |
| TW | 510867 | 11/2002 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| TW | 200741116 | 11/2007 |
| TW | 200821218 | 5/2008 |
| WO | WO 99/08024 | 2/1999 |
| WO | WO 99/20918 | 4/1999 |
| WO | WO 01/73319 | 10/2001 |
| WO | WO 03/086849 | 10/2003 |
| WO | WO 03/100294 | 12/2003 |
| WO | WO 05/083305 | 9/2005 |
| WO | WO 05/108825 | 11/2005 |
| WO | WO 05/111472 | 11/2005 |
| WO | WO 06/091503 | 8/2006 |
| WO | WO 08/078047 | 7/2008 |
| WO | WO 08/100792 | 8/2008 |
| WO | WO 10/017242 | 2/2010 |
| WO | WO 10/135407 | 11/2010 |
| WO | WO 11/064572 | 6/2011 |
| WO | WO 11/101991 | 8/2011 |
| WO | WO 11/121743 | 10/2011 |
| WO | WO 12/030213 | 3/2012 |
| WO | WO 13/042226 | 3/2013 |
| WO | WO 14/186732 | 11/2014 |
| WO | WO 16/062461 | 4/2016 |

OTHER PUBLICATIONS

Second Office Action dated Feb. 24, 2016 in Chinese Patent Application No. 201410145485.3.
Rejection Decision dated Mar. 29, 2015 in Taiwanese Patent Application No. 97144386.
Office Action dated Feb. 24, 2010 from Japanese Patent Application No. 2006-508892.
Office Action dated Feb. 17, 2010 from Japanese Patent Application No. 2009-294086.
International Search Report and Written Opinion dated Feb. 2, 2010 from International Patent Application No. PCT/US2008/068929, filed on Jan. 7, 2008.
Office Action dated Sep. 24, 2012 for Chinese Patent Application No. 200880116244.9.
Office Action dated May 29, 2013 for Chinese Patent Application No. 200880116244.9.
International Search Report and Written Opinion dated May 19, 2009 from International Patent Application No. PCT/US2008/083660, filed on Nov. 14, 2008.
Preliminary Notice of First Office Action dated Jun. 20, 2014 in Taiwanese patent application No. 97144386.
Thomassy: An Engineering Approach to Simulating Traction EHL. CVT-Hybrid International Conference Mecc/Maastricht/The Netherlands, Nov. 17-19, 2010, p. 97.
Office Action dated Dec. 12, 2011 for U.S. Appl. No. 12/271,611.
Office Action dated Jul. 16, 2012 for U.S. Appl. No. 12/271,611.

\* cited by examiner

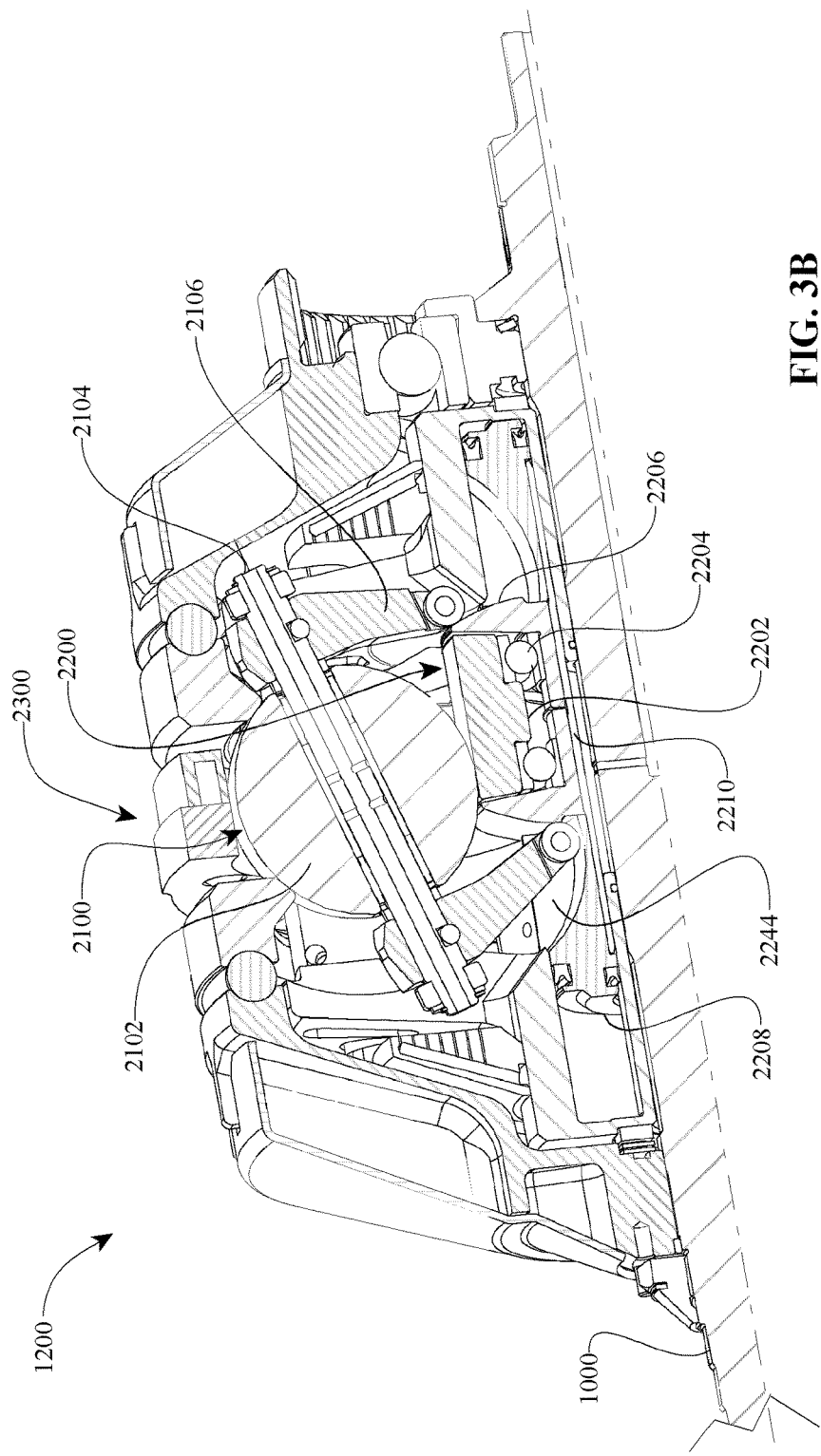

CONTROLLER FOR VARIABLE TRANSMISSION

CROSS REFERENCE TO RELATED APPLICATIONS

This application is a divisional of U.S. patent application Ser. No. 12/271,611, filed Nov. 14, 2008 and scheduled to issue on Nov. 11, 2014 as U.S. Pat. No. 8,886,424, which claims the benefit of U.S. Provisional Application No. 60/988,560, filed Nov. 16, 2007, and entitled "CONTROLLER FOR A CONTINUOUSLY VARIABLE TRANSMISSION." The disclosures of all of the above-referenced prior applications, publications, and patents are considered part of the disclosure of this application, and are incorporated by reference herein in their entirety.

BACKGROUND

Continuously variable transmissions (CVT) and transmissions that are substantially continuously variable are increasingly gaining acceptance in various applications. The process of controlling the ratio provided by the CVT is complicated by the continuously variable or minute gradations in ratio presented by the CVT. Furthermore, the range of ratios that may be implemented in a CVT may not be sufficient for some applications. A transmission may implement a combination of a CVT with one or more additional CVT stages, one or more fixed ratio range splitters, or some combination thereof in order to extend the range of available ratios. The combination of a CVT with one or more additional stages further complicates the ratio control process, as the transmission may have multiple configurations that achieve the same final drive ratio.

The different transmission configurations can, for example, multiply input torque across the different transmission stages in different manners to achieve the same final drive ratio. However, some configurations provide more flexibility or better efficiency than other configurations providing the same final drive ratio.

The criteria for optimizing transmission control may be different for different applications of the same transmission. For example, the criteria for optimizing control of a transmission for fuel efficiency may differ based on the type of prime mover applying input torque to the transmission. Furthermore, for a given transmission and prime mover pair, the criteria for optimizing control of the transmission may differ depending on whether fuel efficiency or performance is being optimized.

Systems and methods are described herein for addressing the complicated and sometimes competing criteria that are addressed in controlling a transmission final drive ratio.

SUMMARY

An electronic controller for a variable ratio transmission and an electronically controllable variable ratio transmission including a variator or other CVT are described herein The electronic controller can be configured to receive input signals indicative of parameters associated with an engine coupled to the transmission. The electronic controller can also receive one or more control inputs. The electronic controller can determine an active range and an active variator mode based on the input signals and control inputs. The electronic controller can control a final drive ratio of the variable ratio transmission by controlling one or more electronic solenoids that control the ratios of one or more portions of the variable ratio transmission.

Aspects of the invention include a method of controlling a variable ratio transmission. The method includes receiving a plurality of input signals, determining an active control range from a plurality of control ranges based at least in part on the plurality of input signals, determining an active variator mode from a plurality of variator modes based on the plurality of input signals and the active control range, and controlling an operation of the variator based on the input signals and the active variator mode.

Aspects of the invention include a method of controlling a variable ratio transmission. The method includes receiving one or more electronic input values, and controlling a current applied to a control solenoid to vary a position of a variator control piston that operates to vary a ratio provided by a variator by varying an angle of a rotation axis for at least one rotating planet in the variator.

Aspects of the invention include a controller system that includes a shift schedule module configured to store a shift schedule map, a shift point module coupled to the shift schedule module, configured to receive a plurality of electronic input signals, and configured to determine an active control range from a plurality of control ranges based at least in part on the plurality of electronic input signals and the shift schedule map, a variator mode module configured to determine a variator mode based on the plurality of electronic input signals and the active control range, and a control module configured to control a ratio of a variator based on the variator mode.

Aspects of the invention include a controller system that includes a transmission having a variable ratio variator whose ratio is varied based at least in part on a position of a longitudinal axis of at least one rotating planet within the variator, and an electronic controller configured to receive a plurality of inputs and generate a control output that varies the position of a longitudinal axis of the at least one rotating planet within the variator based on the plurality of inputs.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 3B is a simplified diagram of an embodiment of a variator.

DETAILED DESCRIPTION OF CERTAIN EMBODIMENTS

Figure 1:
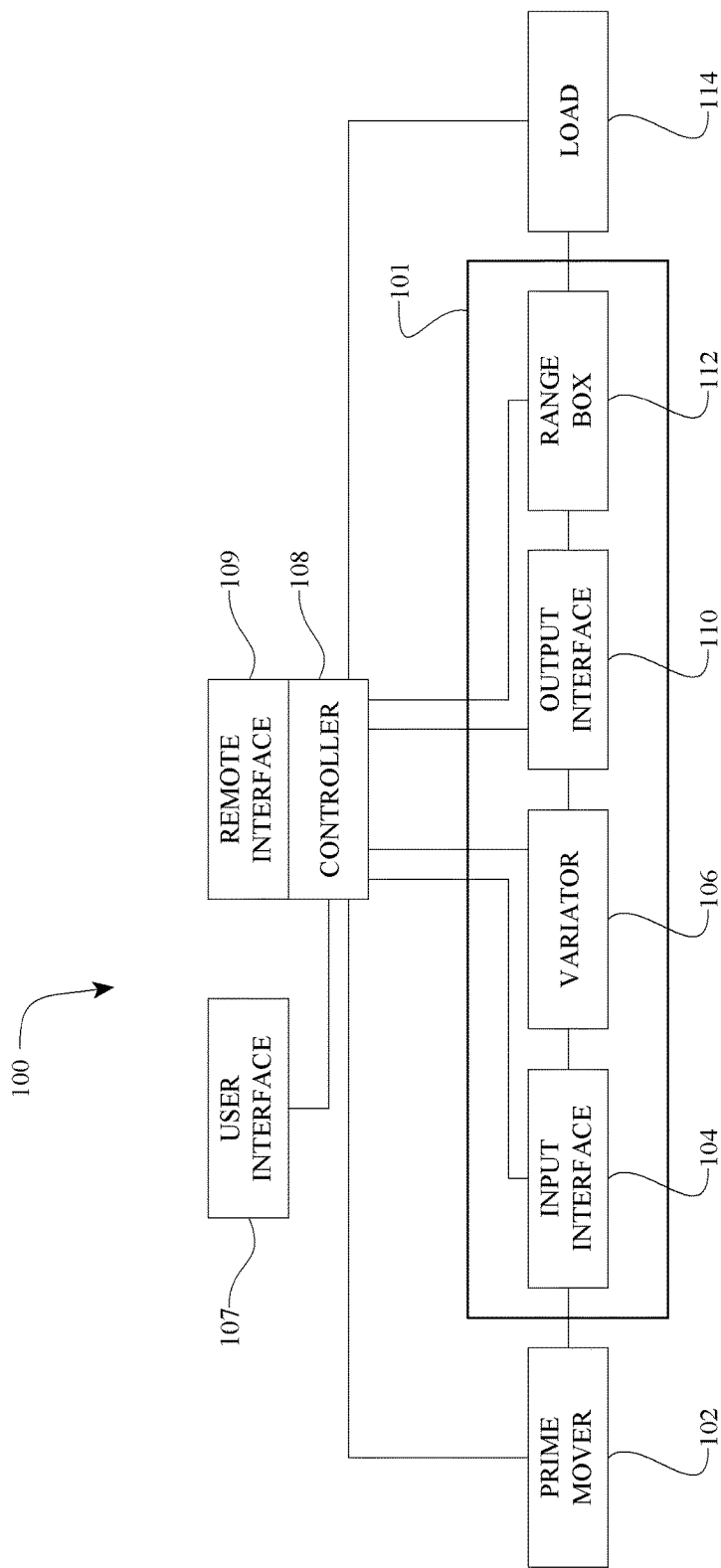
FIG. 1 is a simplified functional block diagram of a drive apparatus including a variable ratio transmission.

An electronic controller for a variable ratio transmission is described herein that enables electronic control over a variable ratio transmission having a continuously variable ratio portion, such as a Continuously Variable Transmission (CVT), Infinitely Variable Transmission (IVT), or variator. The electronic controller can be configured to receive input signals indicative of parameters associated with an engine coupled to the transmission. The parameters can include throttle position sensor values, vehicle speed, gear selector position, user selectable mode configurations, and the like, or some combination thereof. The electronic controller can also receive one or more control inputs. The electronic controller can determine an active range and an active variator mode based on the input signals and control inputs. The electronic controller can control a final drive ratio of the variable ratio transmission by controlling one or more electronic solenoids that control the ratios of one or more portions of the variable ratio transmission.

The electronic controller described herein is described in the context of a continuous variable transmission, such as the continuous variable transmission of the type described in International Application Number PCT/US2008/053347, entitled "CONTINUOUSLY VARIABLE TRANSMISSIONS AND METHODS THEREFOR," assigned to the assignee of the present application and hereby incorporated by reference herein in its entirety. However, the electronic controller is not limited to controlling a particular type of transmission but can be configured to control any of several types of variable ratio transmissions.

As used herein, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe the various embodiments, specific structures or mechanisms that link or couple the elements are typically described. However, unless otherwise specifically stated, when one of said terms is used, the term indicates that the actual linkage or coupling may take a variety of forms, which in certain instances will be obvious to a person of ordinary skill in the relevant technology.

The term "radial" is used herein to indicate a direction or position that is perpendicular relative to a longitudinal axis of a transmission or variator. The term "axial" as used herein refers to a direction or position along an axis that is parallel to a main or longitudinal axis of a transmission or variator. For clarity and conciseness, at times similar components labeled similarly (for example, control piston 582A and control piston 582B) will be referred to collectively by a single label (for example, control pistons 582).

FIG. 1 is a simplified functional block diagram of an embodiment of a drive apparatus 100, which is referred to herein as the drive 100. In some embodiments, the drive 100 includes a transmission 101 operationally coupled between a prime mover 102 and a load 114. The prime mover 102 delivers power to the transmission 101, and the transmission 101 delivers power to the load 114. The prime mover 102 can be one or more of any number of power generating devices, and the load 114 can be one or more of any number of driven devices or components. Examples of the prime mover 102 include, but are not limited to, engines, including but not limited to internal combustion engines and external combustion engines, motors, such as electric motors, and the like, or some combination thereof. Examples of loads include, but are not limited to, drive train differential assemblies, power take-off assemblies, generator assemblies, pump assemblies, and the like.

In one embodiment, the transmission 101 includes an input interface 104, a variator 106, an output interface 110, and a range box 112. The input interface 104 is operationally coupled to the prime mover 102. The variator 106 can be operationally coupled between the input interface 104 and the output interface 110. The range box 112 is operationally coupled between the output interface 110 and the load 114.

A controller 108, such as an electronic controller, can be configured to monitor one or more states, properties, or characteristics of the drive 100. The controller 108 can be configured to receive one or more inputs from a user interface 107, which is typically local to the drive 100 and controller 108. The controller 108 may optionally include a remote interface 109 that is configured to receive one or more inputs from a remote controller (not shown).

The controller 108 can be coupled to the prime mover 102 and can be configured to monitor or otherwise determine one or more characteristics of the prime mover 102. In a particular embodiment where the prime mover 102 includes an internal combustion engine, the controller can be configured to monitor, for example, a throttle position, an engine speed, and the like or some combination thereof.

The controller 108 can also be coupled to one or more stages within the transmission 101, and can be configured to monitor or otherwise determine one or more characteristics of the transmission 101. For example, the controller 108 can be configured to monitor or otherwise determine various mechanical characteristics, fluid pressures and temperatures within each of the input interface 104, variator 106, output interface 110, and range box 112.

The controller 108 can be coupled to the user interface 107 to receive or monitor inputs provided locally. The user interface 107 can include, for example, a gear shift controller, typically referred to as a gear shift lever. The user interface 107 may also include one or more manual mode selectors, which can be selectively activated to control an operational mode of the drive 100. The manual mode selectors can be, for example, one or more switches or programmable elements. In an particular example, the manual mode selectors can selectively indicate an economy mode, a performance mode, a luxury mode, and the like. The manual mode selectors need not be mutually exclusive, but may be activated or disabled simultaneously or otherwise concurrently.

The controller 108 can be coupled to the remote controller (not shown) via the remote interface 109 and can be configured to receive one or more inputs from the remote controller. The remote interface 109 can be a wired interface, wireless interface, and the like, or some combination thereof. In one embodiment, the remote interface 109 can support a wired communication standard. In another embodiment, the remote interface 109 can support a wireless communication standard. In other embodiments, the remote interface 109 can support a proprietary wired or wireless communication interface. Alternatively, the remote interface 109 can be configured to support a combination of wired and wireless interfaces.

The controller 108 can receive, from the remote controller via the remote interface 109, one or more control inputs or monitor inputs. The controller 108 can be configured, for example, to receive programmable updates, tables, operational maps, other information, and the like, or some combination thereof from the remote controller.

The controller 108 can be configured to provide one or more outputs, based at least in part on the inputs, and which can be used to control operational characteristics of the drive 100. For example, the controller 10 can control operational characteristics of the drive 100, and in particular the transmission 101, based on a combination of the inputs and one or more predetermined operational maps, algorithms, or processes. The controller 108 can also be configured to provide one or more outputs that communicate or otherwise indicate a state, characteristic, or condition of one or more aspects of the drive 100. For example, the controller 108 can be configured to control one or more indicators in the user interface 107 or provide diagnostic information to the remote controller via the remote interface 109.

As will be described in greater detail below, the controller 108 can be configured to control a final drive ratio of the transmission 101, including the drive ratio provided by the variator 106 and the drive ratio enabled of the range box 112. The controller 108 can also be configured to control operational characteristics such as shifting characteristics.

In one embodiment the controller 108 can be configured to control a plurality of solenoid valves (not shown) that can control aspects of each of the input interface 104, variator 106, and range box 112. The controller 108 can be configured to control one or more of the solenoid valves using open loop control. Alternatively, or additionally, the controller 108 can be configured to control one or more of the solenoid valves in a closed control loop that utilizes feedback information provided to or monitored by one or more inputs to the controller 108.

The input interface 104 can be configured for receiving power from the prime mover 102 and transferring such power to the variator 106. The output interface 110 can be configured for combining power (that is, torque applied at a given rotational speed) from the variator 106 and transferring such combined power to the range box 112. It is disclosed herein that neither the input interface 104 nor the output interface 110 is necessarily limited to a particular respective physical and/or operational configuration. Accordingly, the input interface 104 may include any gearing or coupling structure suitable for providing such distributed power transfer and distribution functionality, and the output interface 110 may include any gearing or coupling structure suitable for providing such combined power transfer functionality. Examples of the input interface 104 include, but are not limited to, a torque converter assembly, a hydraulic clutch coupling, a manually actuated clutch assembly, a computer-controlled clutch assembly, a magnetorheological clutch coupling, and the like, or some combination thereof.

The variator 106 can be configured for enabling power distributed thereto from the input interface 104 to be transferred to the output interface 110 in a manner whereby torque and/or rotational speed associated with that power is selectively variable (that is, selectively adjustable).

The range box 112 provides various gear selection and clutch engagement functionalities and operates to extend the range of final drive ratios available from the transmission 101. Examples of such gear selection functionality include, but are not limited to, selective engagement of available range box gear ratios and selective engagement of various load drive directions. Examples of such clutch engagement functionality include, but are not limited to, passive implementation of various clutch engagement operations and active implementation of various clutch engagement operations.

Figure 2:
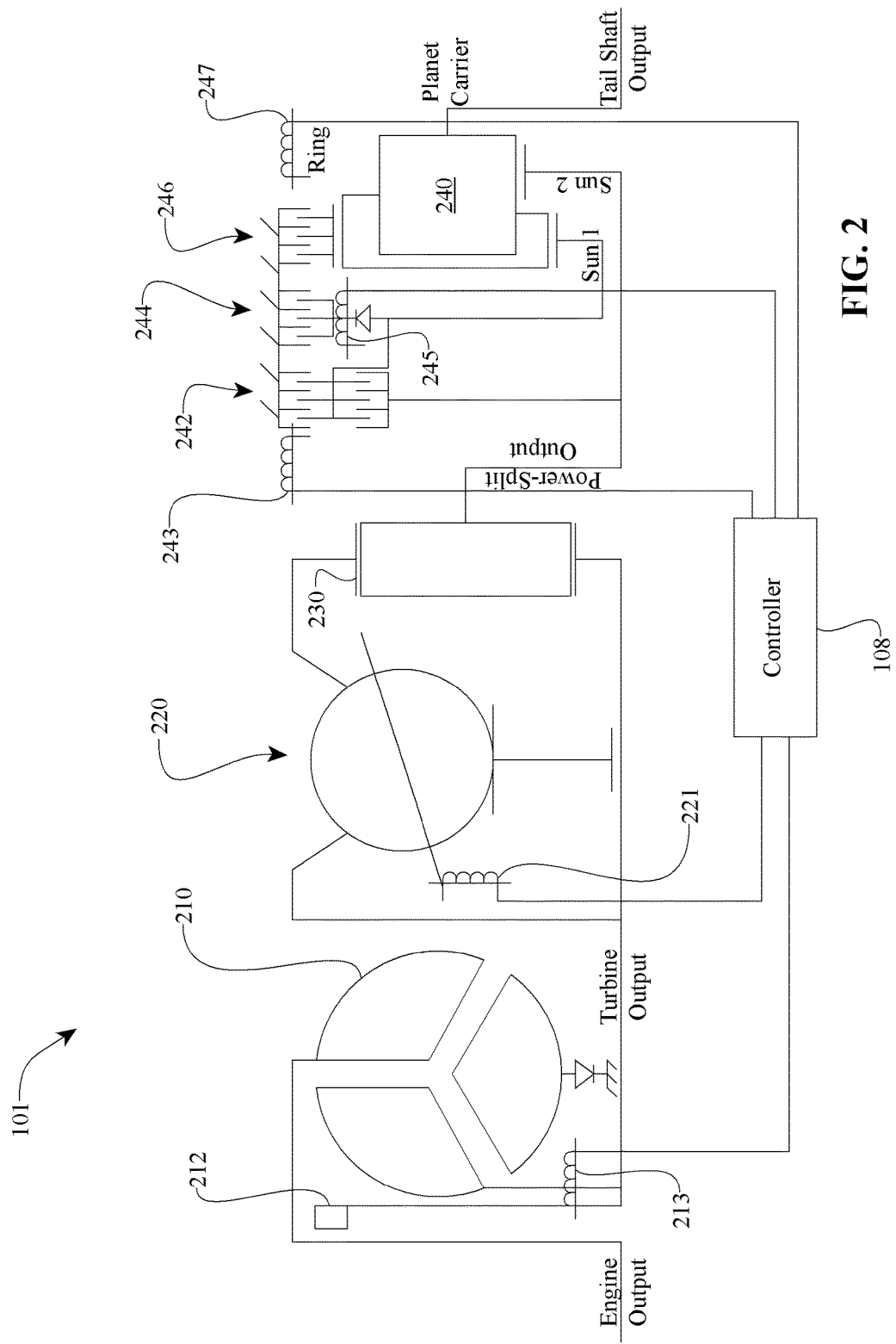
FIG. 2 is a simplified power flow diagram of an embodiment of a variable ratio transmission with electronic control.

FIG. 2 is a simplified diagram of a variable ratio transmission 101 having electronic control. The variable ratio transmission 101 of FIG. 2 can be, for example, the transmission implemented in the drive embodiment illustrated in FIG. 1.

The transmission 101 consists of four major subsystems. The subsystems include a torque converter 210 with a lockup clutch 212, a variator 220, alternatively referred to as a CVT element, a power combiner 230, which can be implemented as a combining planetary gearset, and a two-speed range box 240. The two speed range box 240 can be implemented, for example, as a Ravigneaux gearset and clutches 242, 244, and 246. The transmission 101 is illustrated with a two speed range box 240 for purposes of clarity. Other embodiments may omit the range box 240 and associated clutches 242, 244, and 246 in favor of a reverser, while still other embodiments may implement more than one range box 240 or a range box 240 capable of more than two speeds.

The overall transmission ratio is determined by the torque converter 210, the variator 220, and the range box 240. The range of ratios supported by the variator 220 may produce an overlap in the range of ratios supported by the transmission 101 in the two different range box 240 configurations. Thus, there are multiple ways to achieve a given overall ratio that occurs in the region of overlapping ranges.

An embodiment of a strategy chosen by the control system, and in particular the controller 108, to perform the ratio selection and control is described herein. In general, the variator 220 is relied upon for more precise engine control and smoother operation at low vehicle speeds.

The transmission controller 108 accepts inputs from one or more system sensors and a driver, and operates one or more hydraulic solenoid valves 243, 245, 247, 213, and 221, to control the range clutches 242, 244, 246, variator 220 and torque converter clutch (TCC) 212. The controller 108 can be configured to apply and release each of the solenoid valves 213, 221, 243, 245, and 247 independently based at least in part on the one or more sensor inputs.

Figure 3A:
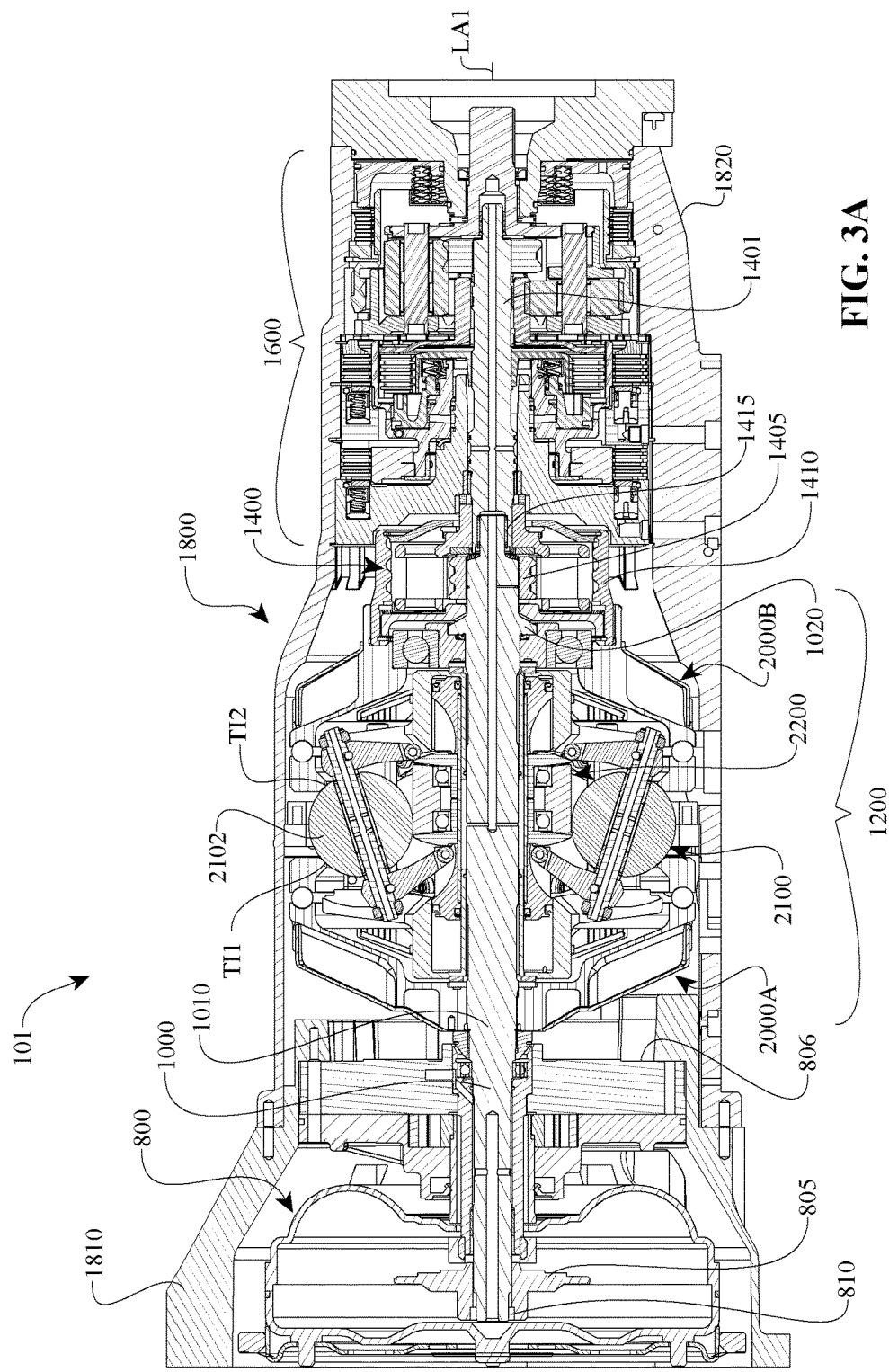
FIG. 3A is a simplified diagram of a variable ratio transmission having electronic control.

FIG. 3A is a simplified diagram of a variable ratio transmission 101 having electronic control. In one embodiment, the transmission 101 can include a torque converter subassembly 800, a main shaft 1000, a variator 1200, a combining device 1400, a range box 1600, and a transmission housing 1800. The transmission housing 1800 can include a bell housing 1810 (that is, a first housing portion) and a rear housing 1820 (that is, a second housing portion) separably connected to the bell housing 1810. In the embodiment illustrated, the torque converter subassembly 800, the main shaft 1000, the variator 1200, the combining device 1400, and the range box 1600 are operably mounted on or within the transmission housing 1800 in an axially aligned manner. Thus, it is disclosed herein that the transmission housing 1800 is configured for housing and supporting various subassemblies and/or components of the transmission 101. In other embodiments, any one of the torque converter subassembly 800, the variator 1200, the combining device 1400, and the range box 1600 can be arranged in a parallel shaft configuration relative to the other components.

In some embodiments, the variator 1200 and the main shaft 1000 can be operably coupled between a power output portion of the torque converter subassembly 800 and power input portions of the combining device 1400. In operation, the torque converter subassembly 800 transfers power to the variator 1200 through the main shaft 1000. The variator 1200 supplies power to a first power input portion 1410 of the combining device 1400. The main shaft 1000 supplies power to a second power input portion 1405 of the combining device 1400. Power from the variator 1200 and the main shaft 1000 can be supplied to the combining device 1400 in a selectively variable ratio (for example, power from the variator 1200 in relation to power from the main shaft 1000) and can be combined by the combining device 1400. The combining device 1400 delivers the combined power to the range box 1600 via a power output portion 1401 of the combining device 1400. The power output portion 1401 can include a carrier of planetary gear set and/or a transfer shaft.

In one embodiment, the variator 1200 mounts on the main shaft 1000. In one configuration, the variator 1200 and the main shaft 1000 form a torque split unit. More specifically, the ratio of torque transferred to the combining device 1400 through the variator 1200 or through the main shaft 1000 is selectively variable dependent upon a torque ratio setting of the variator 1200. To this end, the variator 1200 transfers power to the combining device 1400 in a manner whereby the torque and/or the rotational speed associated with that power is selectively and continuously variable (that is, adjustable). Thus, the variator 1200 can be configured for receiving power of a first specification (for example, first torque and first rotational shaft speed) and outputting power of a second specification (for example, second torque and second rotational shaft speed).

The torque converter subassembly 800 is one embodiment of an input interface 104, for example, thereby providing the functionality of transferring power from a prime mover attached to the torque converter subassembly 800 to the variator 1200 via, for example, the main shaft 1000. In other embodiments, a different type of input interface such as, for example, a manually controlled clutch subassembly, a computer controlled clutch assembly, or a flywheel can be implemented in place of the torque converter subassembly 800. The combining device 1400 is an embodiment of an output interface, thereby providing the functionality of combining power received from the variator 1200 and the main shaft 1000 and transferring such power to the range box 1600. In one embodiment, the range box 1600 receives power from the combining device 1400 and outputs power in conjunction with providing one or more of the various gear selection and clutch engagement functionalities discussed above in reference to FIG. 1. As is discussed further below, the range box 1600 in combination with the variator 1200 enables the transmission 101 to operate in multiple modes (that is, a multi-mode transmission).

In one embodiment, the variator 1200 can include an input load-cam-and-traction-ring subassembly 2000A, an output load-cam-and-traction-ring subassembly 2000B, an array of planet-and-shift-lever subassemblies 2100, a shift-cam-and-sun subassembly 2200, and a stator-manifold subassembly 2300. In one embodiment, the shift-cam-and-sun subassembly 2200 is supported by the stator-manifold subassembly 2300. The shift-cam-and-sun subassembly 2200 is supported in a manner enabling the shift-cam-and-sun subassembly 2200 to be translated along a longitudinal axis LA1 of the main shaft 1000. The planet-and-shift-lever subassemblies 2100 are arrayed angularly around the main shaft 1000, and are supported jointly by the shift-cam-and-sun subassembly 2200 and the stator-manifold subassembly 2300. Each one of the planet-and-shift-lever subassemblies 2100 is supported in a manner that facilitates synchronous rotation of all the planet-and-shift-lever subassemblies 2100 about a respective reference axis TA1 extending through a planet 2102 of each one of the planet-and-shift-lever subassemblies 2100. Through such synchronous rotation, all of the planet-and-shift-lever subassemblies 2100 are in the same relative rotational position at a given point in time. The axis TA1 associated with each one of the planet-and-shift-lever subassemblies 2100 extends through a center point of the respective planet 2102 substantially perpendicular to a radial reference axis RA1 extending from the longitudinal axis LA1 through the center point of the respective planet 2102.

In some embodiments, the main shaft 1000 includes a first end portion 1005, a central portion 1010 and a second end portion 1015. The first end portion 1005 couples to a power output portion 805 of the torque converter assembly 800 (for example, an output hub of a converter turbine) in a manner precluding relative rotation of the main shaft 1000 with respect to the power output portion 805. The central portion 1010 of the main shaft 1000 couples to the input load-cam-and-traction-ring subassembly 2000A in a manner precluding relative rotation of the main shaft 1000 with respect to the input load-cam-and-traction-ring subassembly 2000A. The second end portion 1015 of the main shaft 1000 couples to the first power input portion 1405 of the combining device 1400 in a manner precluding relative rotation of the main shaft 1000 with respect to the first power input portion 1405. The output load-cam-and-traction-ring subassembly 2000B of the variator 1200 couples to a first power input portion 1410 of the combining device 1400 in a manner precluding relative rotation of the output load-cam-and-traction-ring subassembly 2000B with respect to the first power input portion 1410. Thus, the main shaft 1000 is suitably configured for transferring power from the torque converter subassembly 800 (a) directly to the combining device 1400, and (b) to the combining device 1400 through the variator 1200.

Each of the planets 2102 is located by the input load-cam-and-traction-ring subassembly 2000A, the output load-cam-and-traction-ring subassembly 2000B, and the shift-cam-and-sun subassembly 2200. The main shaft 1000 can be configured to exert torque on the input load-cam-and-traction-ring subassembly 2000A. Through traction at a respective input traction interface TI1 between the input load-cam-and-traction-ring subassembly 2000A and each planet 2102, torque is exerted by the input load-cam-and-traction-ring subassembly 2000A on the planets 2102, thereby causing each planet 2102 to rotate about a respective planet axle 2104. The input traction interface TI1 is defined, as used here, at a region of contact between the input load-cam-and-traction-ring subassembly 2000A and the respective planet 2102. Preferably, but not necessarily, traction at each input traction interface TI1 and each output traction interface TI2 is provided through an elastohydrodynamic layer formed by a traction fluid.

Through traction at a respective output traction interface TI2 between the input load-cam-and-traction-ring subassembly 2000B and each planet 2102, torque is exerted by the planets 2102 on the output load-cam-and-traction-ring subassembly 2000B, thereby causing the output load-cam-and-traction-ring subassembly 2000B to rotate about the main shaft 1000. The output traction interface TI2 is defined, as used here, at a region of contact between the output load-cam-and-traction-ring subassembly 2000B and the respective planet 2102. As shown in FIG. 3A, the output load-cam-and-traction-ring subassembly 2000B can be coupled to the combining device 1400. Accordingly, torque can be transferred from the main shaft 1000 to the combining device 1400 through the variator 1200.

As discussed above in reference to FIG. 3A, the ratio of torque transferred to the combining device 1400 through the variator 1200 or through the main shaft 1000 can be selectively variable dependent upon the torque ratio of the variator 1200. The torque ratio refers to a relative position of the input traction interface TI1 and the output traction interface TI2, relative to the axis LA2, for a given tilt of the planet-and-shift-lever subassemblies 2100. When the tangential surface velocity of the planets 2102 at the input traction interface TI1 is the same as the tangential surface velocity of the planets 2102 at the output traction interface TI2, the torque ratio is substantially equal to 1 and there is no corresponding torque multiplication. Through tilting of the planet-and-shift-lever subassemblies 2100, the ratio of the tangential surface velocity of the planets 2102 at the input traction interface TI1 to that of the tangential surface velocity of the planets 2102 at the output traction interface TI2 is selectively adjustable. As discussed further below, the shift-cam-and-sun subassembly can be configured such that translation of the shift-cam-and-sun subassembly 2200 causes such tilt of the planet-and-shift-lever subassemblies 2100. The direction of tilt of the planet-and-shift-lever subassemblies 2100 from the position corresponding to the torque ratio of 1 dictates whether the torque multiplication is greater than 1 (that is, torque output is greater than torque input) or less than 1 (that is, torque input is greater than torque output).

As depicted in FIG. 3A, the input traction interface TB and the output traction interface TI2 are angularly equidistant relative to a radial reference axis RA1 extending through the tangential reference axis TA1. As a result, the torque ratio is 1 when a longitudinal axis LA2 of each planet 2102 is parallel with the longitudinal axis LA1 of the main shaft 1000. Such an equidistant configuration provides for a balanced adjustment range such that full adjustment of the planet-and-shift-lever subassemblies 2100 in a first adjustment direction results in the same absolute torque multiplication value as full adjustment in a second direction. In other embodiments, the input traction interface TI1 and the output traction interface TI2 may be non-equidistant from the reference axis TA1 when the torque ratio is 1.0 and the longitudinal axis LA2 is parallel with the longitudinal axis LA1. Such a non-equidistant configuration provides for biasing of the adjustment range such that full adjustment of the planet-and-shift-lever subassemblies 2100 in the first adjustment direction results in a different absolute torque multiplication value than full adjustment in the second adjustment direction.

As illustrated in the embodiment of FIG. 3A, the variator 1200 can be axially constrained on the main shaft 1000 between an axial reaction flange 1020 of the main shaft 1000 and an axial lock nut 1305. The axial lock nut 1305 includes a threaded bore configured for mating with a corresponding threaded portion 1025 of the main shaft 1000. The axial reaction flange 1020 can be fixedly attached to the main shaft 1000 adjacent the second end portion 1015 of the main shaft 1000. The threaded portion 1025 can be an integral component of the main shaft 1000, adjacent to the central portion 1010 of the main shaft 1000. In one embodiment, the main shaft 1000 includes an anti-rock piloting surface 1028 configured for engaging a mating anti-rock piloting surface of the axial lock nut 1305 for limiting rocking of the axial lock nut 1305 with respect to the main shaft 1000.

A first engagement extension 1030 at the first end portion 1005 of the main shaft 1000 can be configured for engaging or supporting a bearing assembly 810 that interfaces with certain components of the torque converter subassembly 800 or other support member. A second engagement extension 1035 at the second end portion 1015 of the main shaft 1000 can be configured for engaging or supporting a bearing assembly 1415 that interfaces with certain components of the combining device 1400. In some embodiments, the bearing assemblies 810, 1415 include each only a bushing or a bearing component. In other embodiments, the bearing assemblies 810, 1415 each include a bushing or a bearing component and a seal component configured to engage a mating surface of the respective engagement extension 1030, 1035.

FIG. 3B is a simplified diagram of an embodiment of a variator 1200 that can be, for example, the variator in the transmission of FIG. 3A. In the illustrated embodiment of the variator 1200, each one of the planet-and-shift-lever subassemblies 2100 includes a planet 2102 rotatably mounted on a planet axle 2104, which can be positioned on a planet central bore 2103. Spaced apart planet bearings 2108, an inner spacer 2110, and outer spacers 2112 can mount coaxially on the planet axle 2104. In some embodiment, the inner spacer 2110 is positioned between the planet bearings 2108, and each one of the planet bearings 2108 is positioned between a respective one of the outer spacers 2112 and the inner spacer 2110. Accordingly, each planet 2102 is rotatably mounted on a respective planet axle 2104 in a load-bearing and rotatable manner. The variator 1200 is not limited to a particular planet bearing and spacer arrangement for rotatably mounting each planet 2102 on the respective planet axle 2104. For example, in some embodiments, a planet bearing and spacer arrangement using more than two or less two planet bearings and more than two or less spacers (that is, inner position and/or outer position) can be implemented.

Planet axle shift levers 2106 ("shift levers 2106") can be fixedly attached to opposing end portions 2107 of the planet axle 2104 such that the planet 2102 is positioned between the shift levers 2106. The planet axle 2104 extends through a planet axle bore 2111 of each shift lever 2106. In one embodiment, the opposing end portions 2107 include skew roller shoulders 2109 on which skew rollers 2122 mount. Each skew roller 2122 can be held in place by a washer 2124 and a clip ring 2126, which clip ring 2126 can be engaged within a groove in the skew roller shoulder 2109. It is disclosed herein that, in some embodiments, a shift lever 2106 can include one or more features (not shown) such as, for example, a recess, a channel, etc., for providing clearance with other components of the variator 1200.

In some embodiments, a shift guide roller axle 2116 can be engaged within a shift guide roller axle bore 2117 of each shift lever 2106 and within a corresponding axle capturing feature 2119 of the planet axle 2104. In one embodiment, the shift guide roller axle bore 2117 intersects and is generally perpendicular to the planet axle bore 2111. The shift guide roller axle bore 2117 is adjacent to a first end portion 2121 of the shift lever 2106. Examples of the axle capturing feature 2119 include, but are not limited to, a feature generally characterized as a notch, a cut out, a channel, a seat, or the like. The shift guide roller axle 2116 and the corresponding axle capturing feature 2119 can be configured for limiting (for example, substantially precluding) radial displacement of the shift guide roller axle 2116 with respect to the engaged axle capturing feature 2119. Thus, such mating configuration of the shift guide roller axle 2116 and the corresponding axle capturing feature 2119 limits displacement of the shift lever 2106 along the longitudinal axis LA2 of the planet axle 2104 when the shift guide roller axle 2116 is mounted on the planet axle 2104 with the shift guide roller axle 2116 engaged within the shift guide roller axle bore 2117 and the corresponding axle capturing feature 2119. Shift guide rollers 2114 can be mounted on opposing end portions of each shift guide roller axle 2116. Each shift guide roller axle 2116 can be secured in place by, for example, washers 2118 and clip rings 2120, which clip rings 2120 can be engaged within a groove 2191 of the shift guide roller axle 2116. In other embodiments, the shift guide roller axle 2116 can be secured by, for example, an interference fit, press fit, etc. Side faces 2244 can be configured to substantially constrain movement of the shift lever 2106, thereby limiting rotation of the respective shift lever 2106 about the longitudinal axis LA1 of the variator 1200.

Figure 3C:
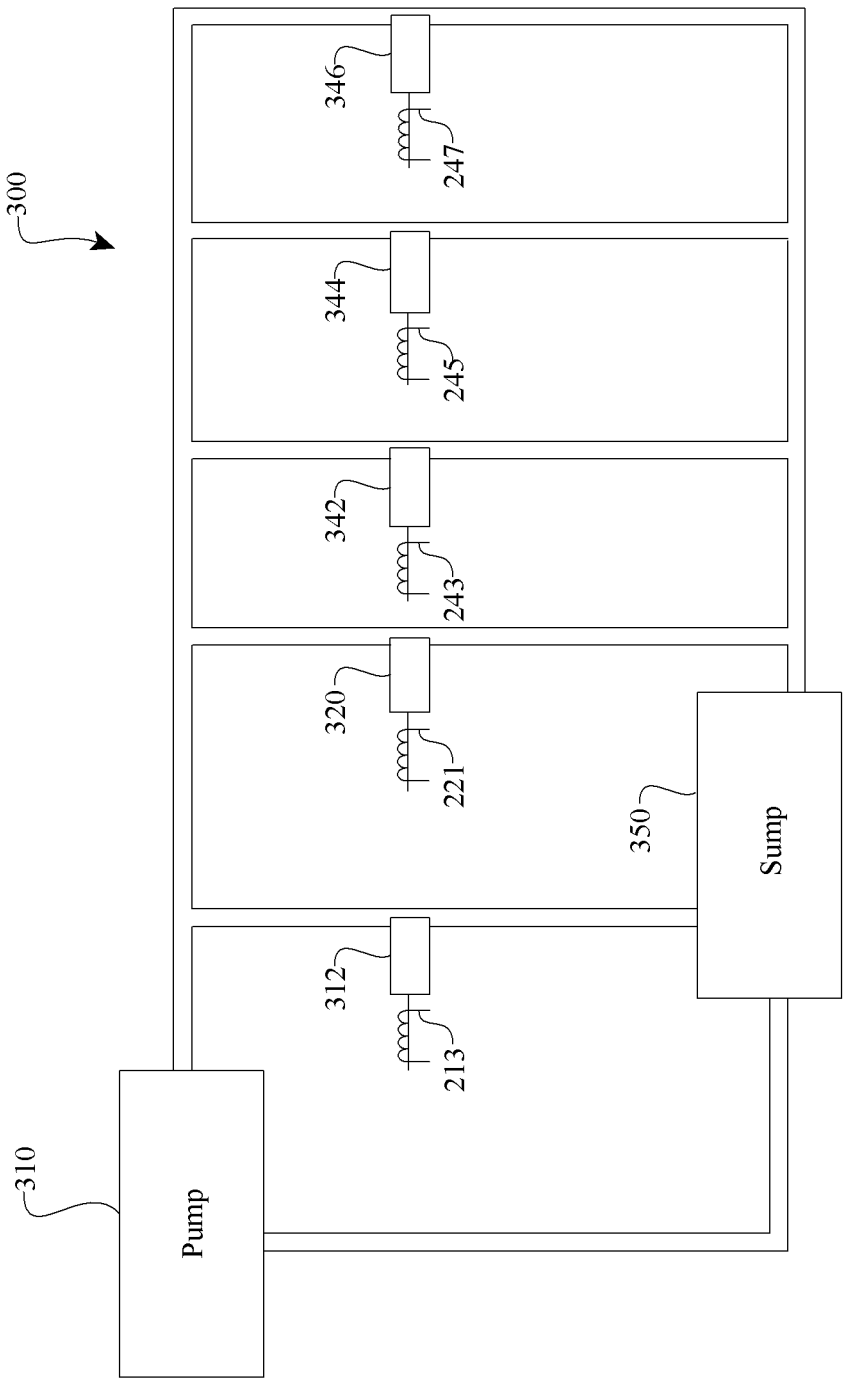
FIG. 3C is a simplified fluid flow diagram of an embodiment of a variable ratio transmission.

In an embodiment of the variator 1200, the shift-cam-and-sun subassembly 2200 can include sun 2202, bearings 2204, shift cams 2206, control pistons 2208, piston tube 2210, shim 2212, inner seals 2214, and outer seals 2216. As shown in FIG. 3C, in some embodiments, the control pistons 2208 are coupled to the shift cams 2206 through the piston tube 2210. The control pistons 2208 and the shift cams 2206 can be mounted on the piston tube 2210 by, for example, a press-fit interface. The sun 2202 can be operationally coupled to the shift cams 2206 through the bearings 2204. The bearings 2204 can be configured to transfer axial and radial loads between the sun 2202 and the shift cams 2206. The sun 2202 and the shift cams 2206 can be configured to receive the bearings 2204. The variator 1200 is not limited to bearings of a particular type. For example, an angular contact bearing is a suitable bearing type for the bearings 2204.

The position of the control pistons 2208 can be selectably controlled, for example, via an electronic solenoid under the control of an electronic controller. The controller can utilize a closed loop control to monitor the transmission state and adjust the electronic solenoid, and thereby the position of the control pistons 2208, accordingly.

FIG. 3C is a simplified fluid flow diagram 300 of an embodiment of a variable ratio transmission. The fluid flow diagram 300 can illustrate, for example, a fluid flow within the transmission of FIG. 3A. The fluid flow diagram 300 illustrates schematically the control of fluid flow and fluid pressures through the use of one or more electronic solenoids. The fluid flow and controls illustrated in the flow diagram 300 of FIG. 3C are illustrative and not intended to be limiting on the number and type of controls that may be implemented within a transmission. Although the fluid flow diagram generally illustrates the electronic solenoids, e.g. 213, as controlling a fluid exhaust, the electronic solenoids are not limited to controlling fluid exhaust, and may be configured to control inlet fluid flow or a chamber volume in order to effectuate the desired control.

In the example of FIG. 3C, fluid, such as hydraulic fluid within the transmission is contained within a sump 350. A pump 310 draws the fluid from the sump, pressurizes it, and distributes it to one or more control paths within the transmission. The pump 310 can be, for example, driven by the primary move via the input interface. In one example, an internal combustion engine drives the torque converter, and the torque converter drives the pump 310. The pump 310 typically includes one or more mechanisms (not shown) for controlling, regulating, or otherwise limiting the fluid pressure. Such mechanisms include, but are not limited to solenoids, check balls, diaphragms, regulators, and the like, or some combination thereof. The line pressure can be static or may be dynamically regulated by the controller. The pressure regulator is not illustrated for the sake of clarity.

The pressurized fluid from the pump 310 is distributed along a plurality of control passages. Each of the control passages can be sized to minimize the drop in fluid pressure experienced at the output of the pump 310 across the entire control range of flow in the control passage.

A first control passage can be, for example, coupled to the torque converter and operate to control the engagement and disengagement of the torque converter clutch. A first electronic solenoid 213 under the control of the controller can selectively control a torque converter clutch piston 312 to selectively control the pressure applied to the torque converter clutch. For example, the first electronic solenoid 213 can be substantially de-energized when the torque converter clutch is not engaged, where de-energized refers to the currently flowing through the solenoid that is insignificant relative to an actuation current. The fluid supplied in the first control passage is permitted to exhaust back to the sump 350 thereby inhibiting sufficient pressure to actuate the torque converter clutch. The first electronic solenoid 213 can be engaged to substantially limit fluid exhaust from the first control passage, thereby permitting build up of pressure within the first control passage and engaging the torque converter clutch.

A second control passage may be implemented in conjunction with a second electronic solenoid 221 and variator control piston 320 to control the ratio provided by the variator. The controller can control the amount of current to the second electronic solenoid 221 to control the fluid exhaust through the second control passage and thereby the position of the variator control piston 320. The position of the variator control piston 320, as described above in relation to FIG. 3B, controls the shift-cam-and-sun subassembly and planet-and-shift-lever subassemblies, which control the ratio provided by the variator.

A third control passage may be implemented in conjunction with a third electronic solenoid 243 and range clutch control piston 342 to control the engagement of the range clutch. The controller can provide an actuation current to the third electronic solenoid 243 to engage the range clutch control piston 342 and permit fluid pressure to engage the clutch. Conversely, the controller can inhibit current to the third electronic solenoid 243 to disengage the range clutch control piston 342 and permit fluid in the third control passage to exhaust to the sump 350, thereby inhibiting pressure applied to the range clutch. The position of the range clutch can be used to control the ratio of the range box.

Similarly, a fourth control passage may be implemented in conjunction with a fourth electronic solenoid 245 and forward clutch control piston 344 to control the engagement of the forward clutch. The controller can provide an actuation current to the fourth electronic solenoid 245 to engage the forward clutch control piston 344, and can inhibit current to the fourth electronic solenoid 245 to disengage the forward clutch control piston 344.

Likewise, a fifth control passage may be implemented in conjunction with a fifth electronic solenoid 247 and reverse clutch control piston 346 to control the engagement of the reverse clutch. The controller can provide an actuation current to the fifth electronic solenoid 247 to engage the reverse clutch control piston 346, and can inhibit current to the fifth electronic solenoid 247 to disengage the reverse clutch control piston 346.

Figure 4:
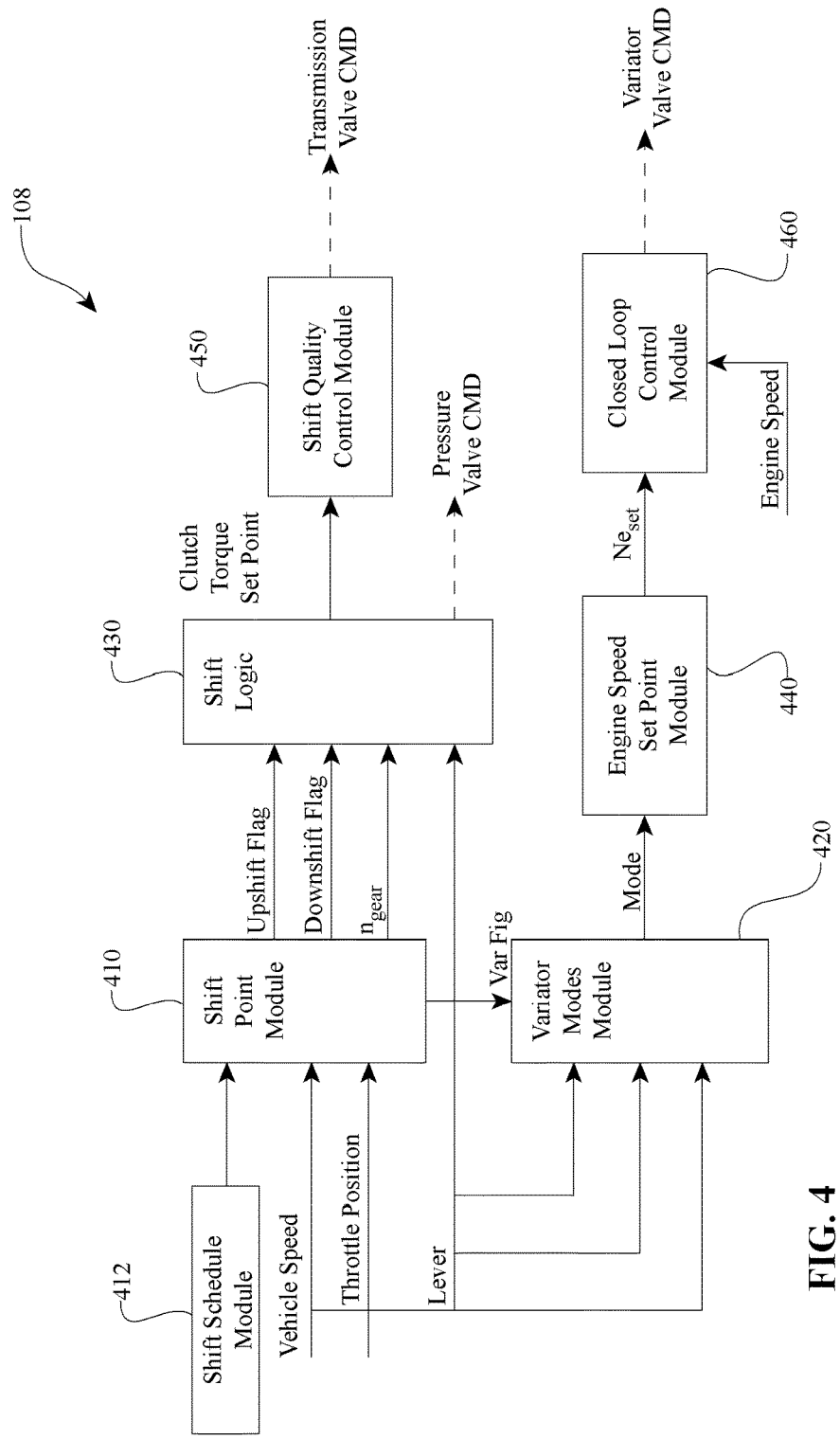
FIG. 4 is a simplified functional block diagram of an embodiment of an electronic controller for a variable ratio transmission.

FIG. 4 is a simplified functional block diagram of an embodiment of an electronic controller 108 for a variable ratio transmission. The controller 108 can be, for example, the controller illustrated in FIG. 1 and can be used, for example, to control the transmission of FIG. 3A. The electronic controller 108 functions are broken down into system inputs, controller outputs, range control, variator control, torque converter clutch locking and diagnostics.

The controller 108 implements a strategy for controlling the range box and variator. The controller 108 determines the appropriate functionality as a function of driver (user) and vehicle inputs in the shift point module 410. The shift logic module 430 determines the appropriate clutches to apply and their required torque capacity. The rate of apply and corresponding solenoid current are computed in the shift quality control module 450. The controller 108 also determines when use of the variator is enabled.

The controller 108 can also be configured to include diagnostics and failure modes to enable the ability to avoid dangerous or destructive conditions and to allow reduced functionality operation in case of failure when possible. Major electrical and hydraulic failures can be addressed, as well as highly degraded performance.

The controller 108 includes a plurality of modules configured to receive input from one or more sensors or controls in the drive system. Each external signal that enters the electronic controller can represent a sensor measurement or a control state. Prior to using the input information, the input data may undergo signal conditioning, scaling, error checking, and the like, or some combination thereof.

The input signals and control states may be analog signals, digital signals, or a combination of analog and digital signals. An initial complement of analog inputs for a particular implementation is listed in Table 1 as an illustrative example. A controller 108 need not support the entire complement of input types. For example, the first three analog signal types may be implemented within a production controller 108. The others analog inputs may be supported in the production implementation or may be included for potential use in development units.

TABLE 1

Analog Inputs

| Input | Range | Excitation | Variable | Units | Range | Type |
|---|---|---|---|---|---|---|
| throttle position | 0-5 V | 5 V | throttle | % | 0-100 | potentiometer |
| sump temperature | 0-5 V | 5 V | Tsump | deg. C | −50 . . . 200 | thermistor |
| variator temperature | 0-5 V | 5 V | Tcool | deg. C | −50 . . . 200 | thermistor |
| P1 servo pressure | 0-5 V | | P1 | kPa (gauge) | 0-3400 | transducer |
| P2 servo pressure | 0-5 V | | P2 | kPa (gauge) | 0-3400 | transducer |
| reverse clutch pressure | 0-5 V | | Prev | kPa (gauge) | 0-3400 | transducer |
| forward clutch pressure | 0-5 V | | Pfwd | kPa (gauge) | 0-3400 | transducer |
| direct clutch pressure | 0-5 V | | Pdir | kPa (gauge) | 0-3400 | transducer |
| manual low clutch pressure | 0-5 V | | Pmlow | kPa (gauge) | 0-3400 | transducer |
| line pressure | 0-5 V | | Pline | kPa (gauge) | 0-3400 | transducer |
| lube pressure | 0-5 V | | Plube | kPa (gauge) | 0-3400 | transducer |
| servo position A | +/−5 V | | XservoA | mm | +/−15.5 | transducer |
| servo position B | +/−5 V | | XservpB | mm | +/−15.5 | transducer |

The controller 108 may also be configured to accept one or more digital inputs. In one embodiment, an active signal is pulled to ground. That is, the controller 108 provides a pull-up function.

The controller 108, and in particular the controller modules receiving sensor and state inputs, can be configured to condition or otherwise process the received input signals. For example, the controller 108 can perform signal conditioning on the input signals to reduce or otherwise mitigate noise effects. For example, the controller 108 may condition inputs that are provided by a thermistor. The controller 108 may implement a pull-up resistor at each thermistor input to form a voltage divider, with the junction voltage providing an indication of resistance.

Typically, the controller 108 performs a linear translation from input voltage to the engineering units, as indicated in Table 1. Inputs that are scaled, shifted, or otherwise conditioned or processed, such as thermistor inputs, may be translated based on a calibration. A lookup table can be used to perform this calibration. Predetermined input signal ranges can be used by the controller 108 to check for sensor failures. The detection of erroneous values will be flagged by the controller 108 for the diagnostic routines.

One or more values may be predetermined and stored within one or more modules of the controller 108. For example, physical dimensions can be used as parameters to estimate variables that are not directly measured. In one instance, the parameters for a range box based on a particular Ravigneaux gear set model are:

$P1m = 3.62$ ratio $n\text{ring}/n\text{sum}1$ $P2m = 2.77$ ratio $n\text{ring}/n\text{sum}2$ The radius of a particular implementation of the variator ball (planet) is:

$R\text{ball}m = 31.75e{-}5m$ model variator ball radius

The plurality of modules operate on the sensors in conjunction with one or more predetermined maps, algorithms, or processes implemented in modules within the controller 108 to determine one or more control signals. One or more output control modules can operate to provide the one or more control signals to their respective control destinations.

The controller 108 outputs can be primarily solenoid controls to control electronic solenoids in the transmission. In addition, the controller 108 can be configured to provide one or more pieces of diagnostic information. The controller 108 can be configured, for example, to provide such diagnostic information as a driver warning light.

The electronic control of the transmission is achieved through electrohydraulic solenoids. A list of the solenoids and their general characteristics is given in Table 2 as an illustrative example. Several different types of solenoid are employed. These may include a variable-force solenoid (VFS), a variable bleed solenoids (VBS), on/off shift solenoids and pulse-width modulated on/off solenoids (PWM). The VFS and VBS types are typically used with closed-loop current control in order to maintain accuracy of control. The on/off solenoids typically require no feedback.

TABLE 2

Solenoid Control Outputs

| Solenoid | Feedback | Voltage | Current | Freq | Variable | Units | Range | Default |
|---|---|---|---|---|---|---|---|---|
| Line pressure VFS | current | 9-14 V | 1 A | 300 Hz | iLine | mA | 0-1000 | press. |
| Low VBS | current | 9-14 V | 1 A | 300 Hz | iLow | mA | 0-1000 | press. |
| Direct VBS | current | 9-14 V | 1 A | 300 Hz | iDirect | mA | 0-1000 | exh. |
| Reverse VBS | current | 9-14 V | 1 A | 300 Hz | iReverse | mA | 0-1000 | press. |
| Ratio VBS | current | 9-14 V | 1 A | 300 Hz | iRatio | mA | 0-1000 | press. |
| Forward shift | no | 9-14 V | 1 A | 0 Hz | ManShift | logic | 0-1 | exh. |
| Forward sequence | no | 9-14 V | 1 A | 0 Hz | FwdOn | logic | 0-1 | exh. |
| TCC PWM | no | 9-14 V | 1.5 A | 32 Hz | TCCduty | % | 0-100 | exh. |

The controller 108 can generate PWM signals, using, for example, microcomputer timers. Pulses are generated at the appropriate frequency with width according to duty cycle. Narrow pulses represent low duty cycle and wide pulses for high duty cycle. Although they are not specifically designated as PWM solenoids, the VFS and VBS can use a PWM signal as part of their control. In this case, however, the appropriate output module from the controller 108 adjusts the duty cycle that an average current feedback tracks the command. The controller 108 can generate PWM signals with a relatively high frequency, that is typically higher than an update rate of non-PWM controlled solenoids, and higher than a response time of the solenoid, so that the solenoid valve does not actually cycle on and off each pulse, but instead, provides a smooth response. In effect, the response time characteristic of the electronic solenoid operates as a lowpass filter to smooth the PWM signal.

The controller 108 includes a shift point module 410 configured to receive input from one or more of a shift schedule module 412, a plurality of sensors, including, but not limited to, a vehicle speed sensor, a throttle position sensor, one or more control state sensors, such as a shift position lever state sensor, and the like.

The list of sensor signals and switch inputs in Table 3 represents the digital inputs to the transmission controller 108. Table 3 is an illustrative example of one embodiment of the sensor signal and switch inputs.

TABLE 3

Digital Inputs

| Input | Range | Sense | Variable | Logic | Type |
|---|---|---|---|---|---|
| pressure switch N | 0-12 V | ground | PRNDLN | code | boolean |
| pressure switch R | 0-12 V | ground | PRNDLR | code | boolean |
| pressure switch P | 0-12 V | ground | PRNDLP | code | boolean |
| zero throttle switch | 0-12 V | ground | throttle0 | inverted | boolean |
| 100% throttle switch | 0-12 V | ground | throttle100 | inverted | boolean |
| PRNDL Park Switch | 0-12 V | ground | ParkSwitch | inverted | boolean |
| PRNDL Manual+ | 0-12 V | ground | ManualUp | inverted | boolean |
| PRNDL Manual− | 0-12 V | ground | ManualDown | inverted | boolean |
| Brake | 0-12 V | ground | BrakeSwitch | inverted | boolean |
| Perf/Economy Switch | 0-12 V | ground | Performance | TRUE | boolean |

An embodiment of a pressure switch manifold decoding is shown in Table 4 as an illustrative example. On each of the three input lines (N, R and P), logic 0 represents a closed switch and 1 is open, or floating. Because neutral and park are identical hydraulically, only two of the bits (N and P) are needed to identify the four possible states. Park and neutral can be distinguished via the park switch on the PRNDL lever. The decoded PRNDL position is represented by the variable lever.

TABLE 4

Pressure Manifold Logic

| Range | N | R | P | Lever |
|---|---|---|---|---|
| Park | 1 | 0 | 1 | 0 |
| Reverse | 0 | 0 | 1 | 1 |
| Neutral | 1 | 0 | 1 | 2 |
| Drive | 1 | M | 0 | 3 |
| Low | 0 | M | 0 | 4 |

In Drive and Low, the third pressure manifold bit, R, indicates the status of the manual low clutch. The table entry M is logic 1 when the clutch is pressurized and logic 0 when it is vented.

The five speed inputs listed in Table 5 can be sensed by the frequencies of toothed wheels passing a magnetic pickup. Each speed sensor generates a pulse train that triggers timer circuits, for example, within the shift point module 410 or an optional speed sensor conditioning module (not shown). The timers can determine the period of each pulse, and the reciprocal of the period is the frequency of the pulse train. Pulses of a duration that is either much shorter or larger than the trend can be assumed to represent noise and can be discarded. Persistently erratic or lost pulses can be reported to a diagnostic routine.

In one embodiment, the frequency can be scaled. For example, the pulse frequency can divided by the number of pulses per revolution and the result multiplied by 60 to arrive at the shaft speed in rpm. Vehicle speed can be approximated from tail shaft speed, neglecting slip, which may be negligible.

TABLE 5

Speed Inputs

| Input | Pulse/Rev | Type | Voltage | Variable | Units | Range | Type |
|---|---|---|---|---|---|---|---|
| Engine speed | TBD | Hall | 5 V | Ne | rpm | 0-10000 | unsigned |
| Turbine speed | TBD | Hall | 5 V | Nturb | rpm | 0-10000 | unsigned |
| Variator output speed | TBD | Hall | 5 V | Nvar | rpm | 0-10000 | unsigned |
| Reverse ring speed | TBD | Hall | 5 V | Nring | rpm | 0-10000 | unsigned |
| Tail shaft speed | TBD | Hall | 5 V | Ntail | rpm | 0-10000 | unsigned |

The shift point module 410 operates on the inputs to determine which one of a plurality of ranges to operate within. The electronic controller 108 configured to control the transmission of FIG. 3A having a two-ratio range box and a CVT variator can implement virtually an infinite number of ratio combinations within the ratio range. The controller 108, and in particular, the shift point module 410 is configured to provide transmission control based on a predetermined number of control ranges. The number of ranges and the span for each of the predetermined control ranges can be stored, for example, in the shift schedule module 412. For example, the controller 108 can implement three control ranges. The shift point module 410 can determine, based on the inputs, the relevant control range and can identify the active control range by the variable ngear. Table 6 is an example of an embodiment of transmission control range designations. In one example, the shift point module 410 determines the appropriate range based on the shift curves stored in the shift schedule module 412.

TABLE 6

Transmission Control Range Designations

| ngear | variator | range |
|---|---|---|
| 1 | Underdrive | Low |
| 2 | Engine speed control | Low |
| 3 | Overdrive | Direct |

The shift point module 410 can also determine and output a variator flag value. The shift point module 410 can determine the state of the variator flag based at least in part on the ngear control range state. The shift point module 410 can output, for example, an active variator flag in those control range states when active variator control is enabled.

In the first control range, the controller 108 controls both the variator and range box to be in low, giving the maximum possible underdrive. In the second control range, the controller 108 controls the variator ratio and the range of ratios can be shifted toward one-to-one and beyond into overdrive, while the range box remains in low. In the third control range, the controller 108 controls the range box to shift to one-to-one (direct) with the variator controlled to operate in full overdrive.

The shift point module 410 provides the ngear value and appropriate shift flags to the shift logic module 430. The shift logic module 430 operates on the input values and outputs shift control commands as well as a line pressure valve control. For example, the shift logic module 430 can determine the current state of the control range based on the ngear value provided by the shift point module 410. The shift logic module 430 operates on an active upshift flag to command an upshift of the transmission. Conversely, the shift logic operates on an active downshift flag to command a downshift of the transmission.

The shift logic module 430 can also be configured to command the application of the torque converter clutch to control whether the torque converter is engaged into a lockup state. The controller 108 can lock the torque converter clutch in order to operate the transmission more efficiently. The shift point module 410 in combination with the shift logic module 430 may determine the conditions for torque converter lockup in a manner similar to the range control strategy. The conditions under which the controller 108 applies the torque converter clutch can be determined by driver input and vehicle speed. In one embodiment, the shift point module 410 can implement the conditions for torque converter lockup as another range value in the number of predetermined control ranges. In such an embodiment, the shift point module 410 can implement the additional torque converter lockup clutch as an additional shift strategy stored in the shift schedule module 412.

The shift logic module 430 can be configured to provide line pressure valve control information directly to a line pressure solenoid in order to adjust the line pressure within the transmission. This is discussed in further detail below. The shift logic module 430 can also be configured to directly control the torque converter clutch solenoid to selectively engage or disengage the torque converter clutch.

The shift logic module 430 sends the shift commands, whether upshift or downshift, to a shift quality control module 450 that operates to control the appropriate pressure control solenoid to achieve a particular shift quality. As will be subsequently explained in further detail, the shift quality control module 450 can operate on the shift control from the shift logic module 430 by implementing a particular shift profile. The shift quality control module 450 implements a particular shift profile, for example, by controlling current applied to the appropriate shift solenoid based on the shift profile.

The shift quality control module 450 can implement different shift profiles to provide differing shift characteristics. For example, the shift quality control module 450 can implement a rapid first shift profile when the transmission is operated in a performance mode and can implement a gentle second shift profile when the transmission is operated in a luxury mode.

A variator mode module 420 operates to control the ratio provided by the variator. The variator mode module 420 can determine when the variator can be controlled according to several different modes. Typically, the engine speed is controlled by the variator in order to achieve objectives of performance or fuel economy, for example. Alternatively, a specific ratio may be commanded. In each of these cases, the objective can be translated to a desired instantaneous engine (or turbine) speed. A variator valve can be adjusted dynamically to track this setpoint. Full overdrive and underdrive may be commanded at the extremes of operation.

The variator mode module 420 can be configured to receive sensor and control state inputs which may be the same, distinct from, or at least partially overlap the sensor and control state inputs received at the shift point module 410. The variator mode module 420 also receives a variator flag value from the shift point module 410.

The controller 108, and in particular the variator mode module 420, may limit dynamic control of the ratio of the variator to those situations where the variator flag is active. If the variator flag is active, the variator mode module 420 can determine a variator mode and a corresponding variator control based on the various inputs. Alternatively, if the variator flag is inactive, the variator mode module 420 determine a static state of the variator based on the input signals. In an alternate embodiment, the variator mode module 420 may also receive the ngear value from the shift point module 410 and determine the state of the variator control based in part on the ngear value as well as the state of the variator flag.

The variator mode module 420 can determine an active one of a plurality of variator modes based on the input signals. The controller 108 can, for example, implement a plurality of variator modes. Although there is virtually no limit to the number of variator modes that the controller 108 may implement, the majority of driving conditions may be satisfied using fewer than approximately ten variator modes. Each variator mode allows the controller 108 to control the variator (or CVT) to provide good drivability according to the driver inputs, engine and vehicle conditions. Examples of the various variator modes and conditions for their operation are provided below.

The variator mode module 420 outputs the variator mode value to an engine speed setpoint module 440. The engine speed setpoint module 440 operates to control the variator in order to control at least one of an engine speed or variator ratio that depends on the variator mode.

The engine speed setpoint module 440 can determine a desired engine speed, for example, based in part on one or more algorithms, engine maps, and the like or some combination thereof. The various engine maps and algorithms can be stored within memory within the engine speed setpoint module 440 or in memory otherwise accessible by the engine speed setpoint module 440.

The engine speed setpoint module 440 provides the target engine speed to a closed loop algorithm control module 460. The closed loop algorithm control module 460 receives the target engine speed and actual engine speed as input values. The actual engine speed can be determined based on one or more sensor values, such as, for example provided by a crankshaft sensor or flywheel sensor.

The engine speed setpoint module 440 generates a control output to maintain the actual engine speed to within an error tolerance of the target engine speed. In one embodiment, the engine speed setpoint module 440 outputs a current signal that is used to control a variator valve. In a particular example, the engine speed setpoint module 440 modulates the current provided to an electronic solenoid that controls a position of a variator control piston within the variator.

The engine speed setpoint module 440 can, for example, compare the target engine speed against the actual engine speed and generate an error signal that is used to control the output signal. The engine speed setpoint module 440 can implement a loop filter and loop gain to achieve the desired control characteristics. For example, a lower bandwidth on the loop filter may eliminate unwanted spurious effects on the control output, but at a cost of speed at which the engine speed setpoint module 440 can react to sudden changes in either the target engine speed or the actual engine speed.

The engine speed setpoint module 440 can control the ratio solenoid of the variator so that the measured engine speed feedback tracks the setpoint. The engine speed setpoint module 440 can perform PI (proportional+integral) control. The general form of the equations is shown below.

In proportional control, the difference between the setpoint and feedback represents the closed loop error. This difference is multiplied by a constant of proportionality to increase or decrease the solenoid current and corresponding variator ratio, as required.

$e0 = Neset - Ne$ $u0 = Kvarp*e0, Kvarp = 1e-4$ A/rpm, proportional gain

The engine speed setpoint module 440 can accumulate the integral of the error to minimize steady-state error in the control loop. The engine speed setpoint module 440 can approximate this integral in discrete time.

$e1 = e1 + Ts*e0,$ $uI = Kvari*e1,$ $Kvari = 0$ A/rpm/sec integral gain $Talg = 0.01$ sec sample time interval The engine speed setpoint module 440 can limit the sum of the control action to be within a usable range of the solenoid. The engine speed setpoint module 440 can perform ratio limit based on the pseudo code provided below.

```
if (u0 + ul > iRatioMax)
    iRatio = iRatioMax
    freeze the value of e1
else if (u0 + u 1 < iRatioMin)
    iRatio = iRatioMin
    freeze the value of e1
else
    iRatio = u0 + ul
```

The functions of the various modules within the controller 108 may be implemented as hardware, software, or as a combination of hardware and software. The controller 108 can include a processor 492 or computer and one or more processor readable or computer readable media. The one or more processor readable or computer readable media can be implemented, for example, as memory 494. The processor readable or computer readable media can be encoded with one or more instructions, data, or information that are arranged as software instructions that, when executed by the processor or computer, implement the functionality of portions or all of one or more of the modules within the controller 108.

Figure 5:
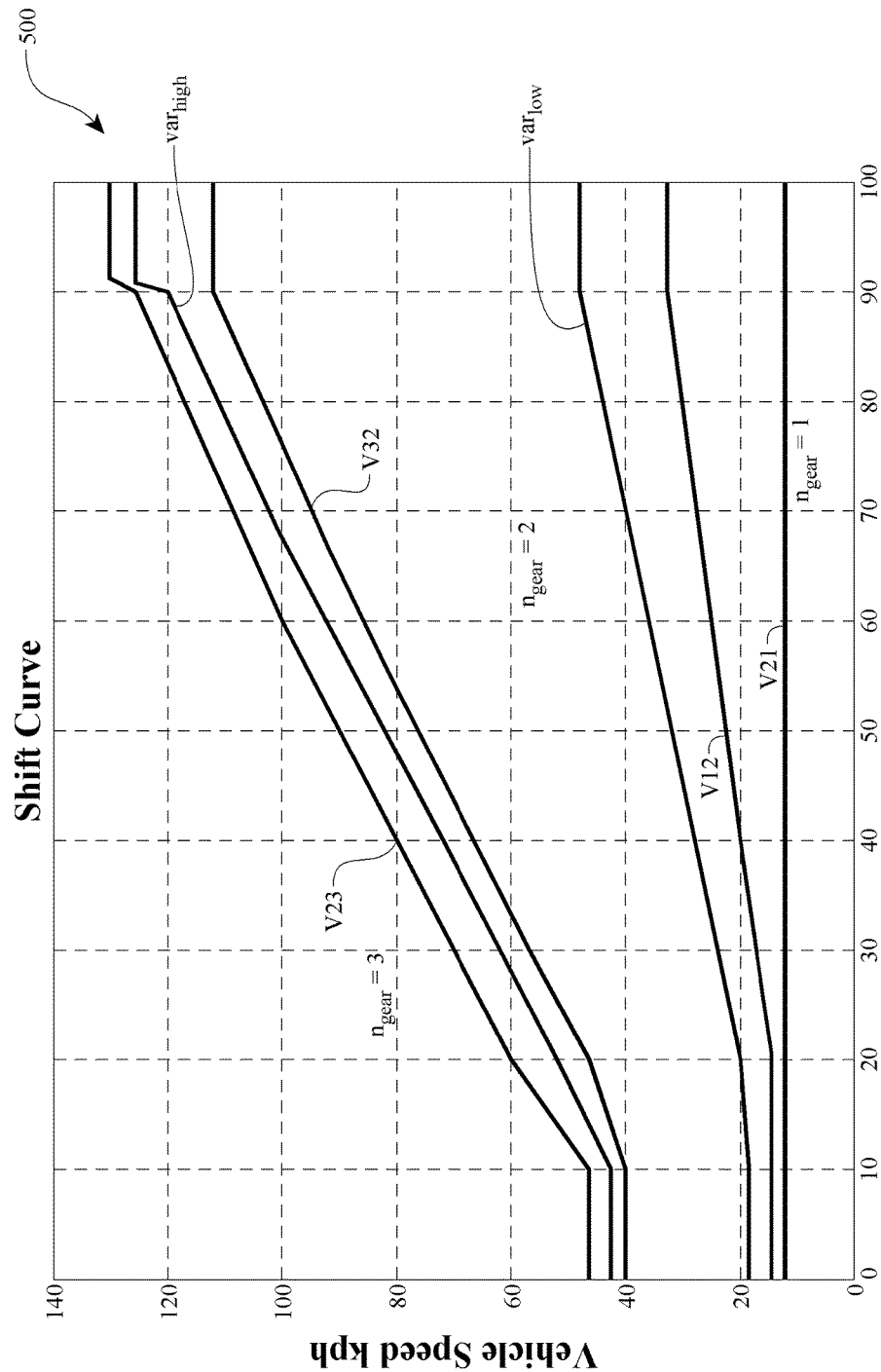
FIG. 5 is a simplified diagram of an embodiment of a transmission shift curve implemented by an electronic controller.

FIG. 5 is a simplified diagram of an embodiment of a transmission shift curve 500 implemented by an electronic controller. As described above, the controller may implement three distinct ngear control ranges.

The appropriate range is determined by the controller according to shift curves such as those shown in FIG. 5. A threshold is calibrated, in terms of vehicle speed as a function of throttle. V12 is the curve that directs the transmission to ngear=2. This enables the variator ratio control as a function of engine speed. The V21 is the downshift curve for the overall transmission into low. The curve varlow shows that the variator will be in low ratio prior to the 2-1 downshift. Note that the transition into low is at a somewhat lower speed to prevent hunting. V23 is the curve that signals an upshift, ngear=3, to the range box. This shifts the range box from low to high, which may be direct. The controller 108 commands the variator to a predetermined ratio, such as a predetermined overdrive ratio by virtue of the varhigh curve. The V32 curve signals, ngear=2, the range box to downshift from direct to low and enables the variator back into a control mode.

The shift curves can be implemented as table values stored in the shift schedule module. The tables values and shift curves can be changed to achieve a particular vehicle performance criterion. For example, the shift schedule module can be configured to store a plurality of shift curves corresponding to a plurality of selectable user selectable transmission characteristics. The controller can select or otherwise access a particular shift curve instantiation based on the value of the user selectable characteristic. In one example, a user interface may permit a user to select from a performance mode or an economy mode. A distinct shift curve may be stored within the shift schedule module for each user selectable mode and accessed by the controller upon activation by the user. The various shift curves can be based on maximum engine torque, and may differ based on the type and characteristics of the prime mover coupled to the transmission.

An illustrative example of the data included in a shift curve is provided below.

| | | |
|---|---|---|
| Th_set = [0 10 20 40 60 90 91 100] | pct | throttle angle |
| V12 = [12 12 12 20 25 30 30 30] | kph | 1-2 upshift |
| V21 = [10 10 10 10 10 10 10 10] | kph | 2-1 downshift |
| V23 = [45 45 60 80 100 125 130 130] | kph | 2-3 upshift |
| V32 = [42 42 50 73 92 120 125 125] | kph | 3-2 downshift |
| Tconfirm | sec | delay time for shift point |

The variator control described above can be implemented, for example, with five variator control modes listed in Table 7. These variator control modes permit the transmission to provide good drivability according to the driver inputs, engine and vehicle conditions.

TABLE 7

Variator Control Mode Definition

| Variator Mode | Name | Function |
|---|---|---|
| 0 | Idle | Underdrive |
| 1 | Launch | Underdrive |
| 2 | Drive | Engine Speed Control |
| 3 | High | Overdrive |
| 4 | Manual | Ratio Control |
| 5 | Coast | Ratio Control |
| 6 | Low Freewheel | Ratio Control |
| 7 | Reverse | Ratio Control |

Figure 6:
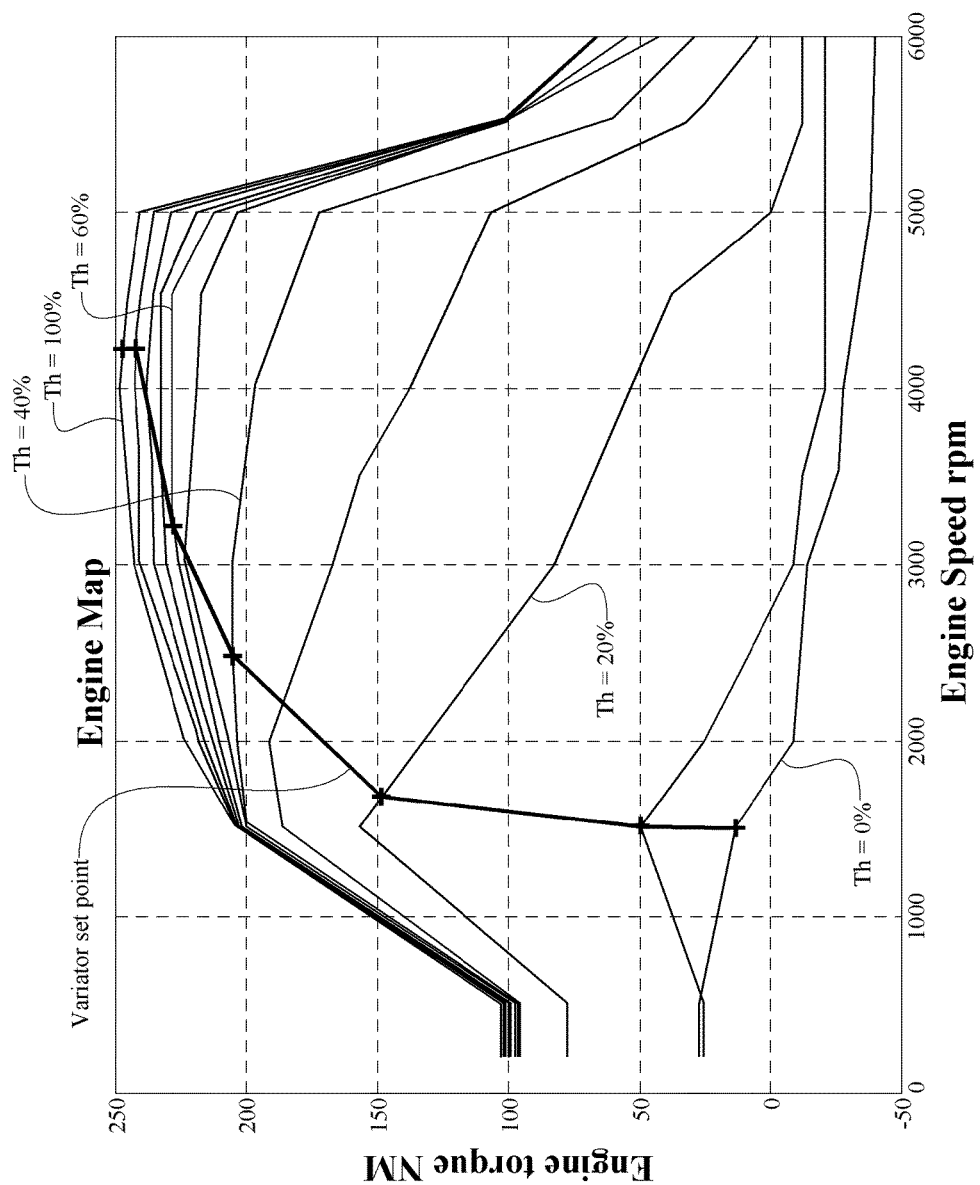
FIG. 6 is a simplified diagram of an embodiment of an engine speed map implemented by an electronic controller.

FIG. 6 is a simplified diagram of an embodiment of an engine speed map 600 implemented by an electronic controller. The variator control modes can be implemented directly be the variator mode module.

The variator mode module may implement the ratio control of modes 0, 1, and 3 directly based on a predetermined control value for the variator mode. In modes 0 and 1, the variator mode module can be configured to set the variator ratio to a predetermined underdrive value, such as a minimum underdrive ratio. Conversely, in mode 3, the variator mode module can be configured to set the variator ratio to a predetermined overdrive value, such as a maximum overdrive ratio.

Mode 2 is the main dynamic control mode of the variator. The control strategy the for mode 2 implemented by the controller, and in particular the variator mode module, can be to maintain the engine speed at some optimum operating point based on a specific criteria. The ratio of the variator is changed to satisfy a closed loop engine speed control system. The engine speed set point function is based on the chosen operating criteria. The criterion for this strategy is based on an engine speed set point established near the maximum engine torque for each throttle. This performance criterion can be seen by plotting the engine set points on the engine map 600.

| | | |
|---|---|---|
| Th_setv = [0 10 20 40 60 90 100] | pct | throttle angle |
| Ne_set2 = [1500 1500 1675 2450 3200 4200 4200] | rpm | engine speed setpoint mode 2 |

Figure 7:
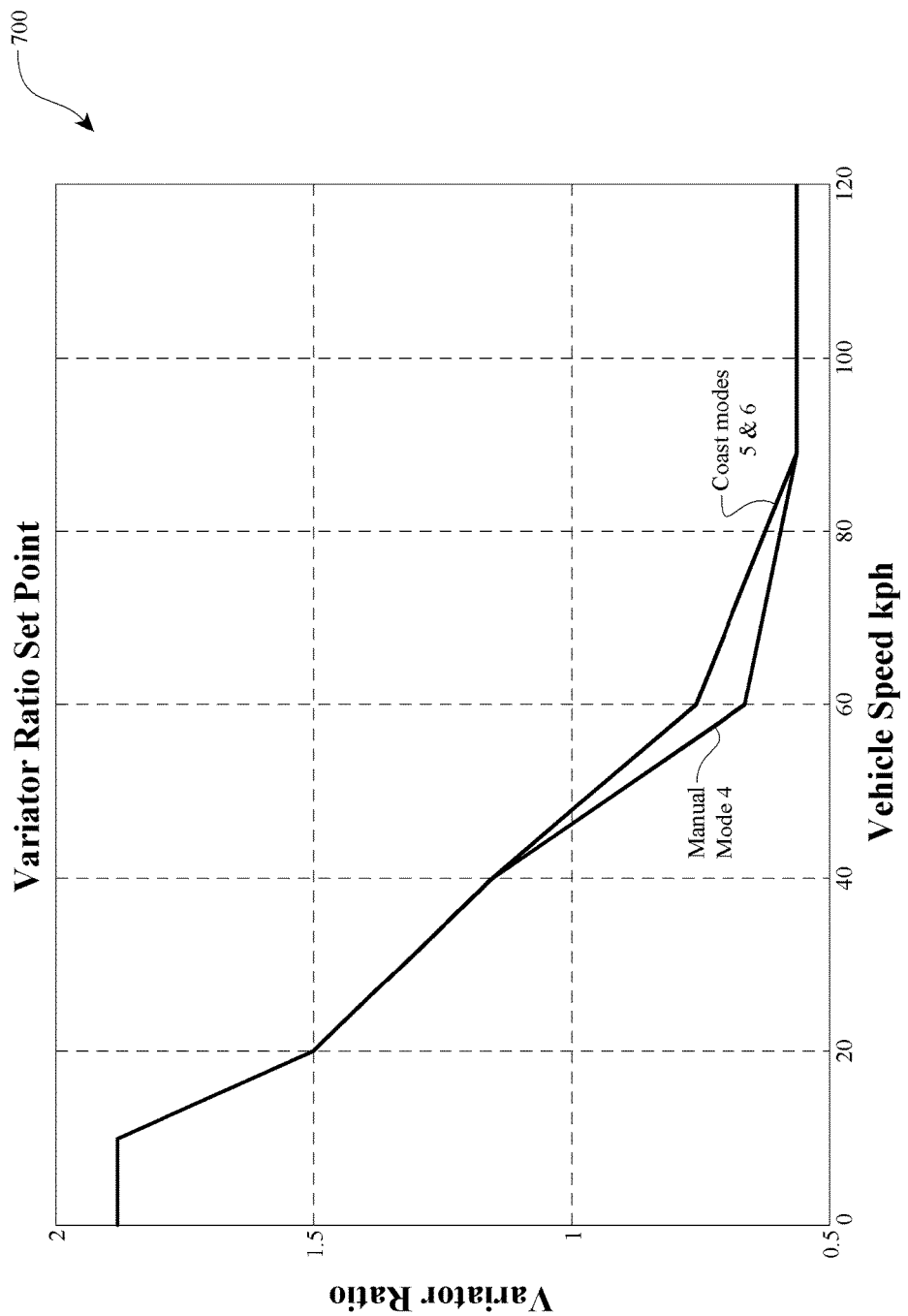
FIG. 7 is a simplified diagram of an embodiment of a variator map implemented by an electronic controller.

FIG. 7 is a simplified diagram of an embodiment of a variator ratio map 700 implemented by an electronic controller. The variator mode module may implement the variator ratio map 700 of FIG. 7 via one or more look up tables for the corresponding modes. An example of the type of information included in the look up tables is provided below. The variator mode module may map the predetermined ratio to a corresponding solenoid control value.

| | | |
|---|---|---|
| V_set = [0 10 20 40 60 90 100 120] | kph | Vehicle speed mode 4, 5, 6 |
| Ratio_set4 = [1.88 1.88 .55 .55 .55 .55 .55 .55] | | variator ratio set point mode 4 |
| Ratio_set5 = [1.88 1.88 1.5 1.15 .75 .55 .55 .55] | | variator ratio set point mode 5&6 |

Figure 8:
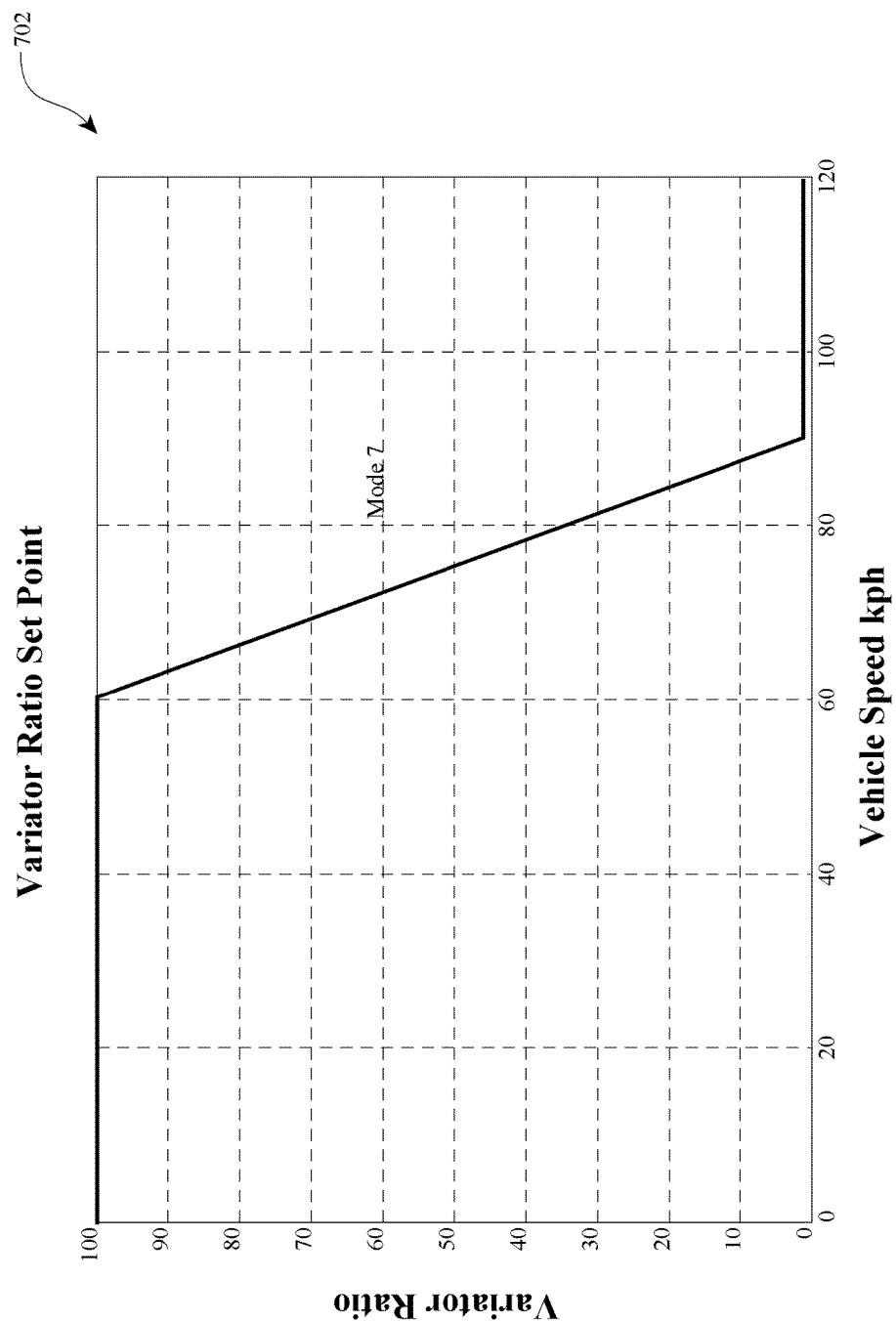
FIG. 8 is a simplified diagram of an embodiment of a variator map implemented by an electronic controller.

FIG. 8 is a simplified diagram of an embodiment of a variator ratio map 702 implemented by an electronic controller. In the embodiment of FIG. 8, the variator ratio map is implemented in a look up table and is used by the variator mode module to control the variator ratio in mode 7, corresponding to reverse. An example of the type of information included in the look up tables is provided below. The variator mode module may map the predetermined ratio to a corresponding solenoid control value.

| | | |
|---|---|---|
| V_set = [0 10 20 40 60 90 100 120] | kph | Vehicle speed set point mode 7 |
| Ratio_set7 = [100 100 100 100 100 55 55 55] | | variator ratio set point mode 7 |

Figure 9:
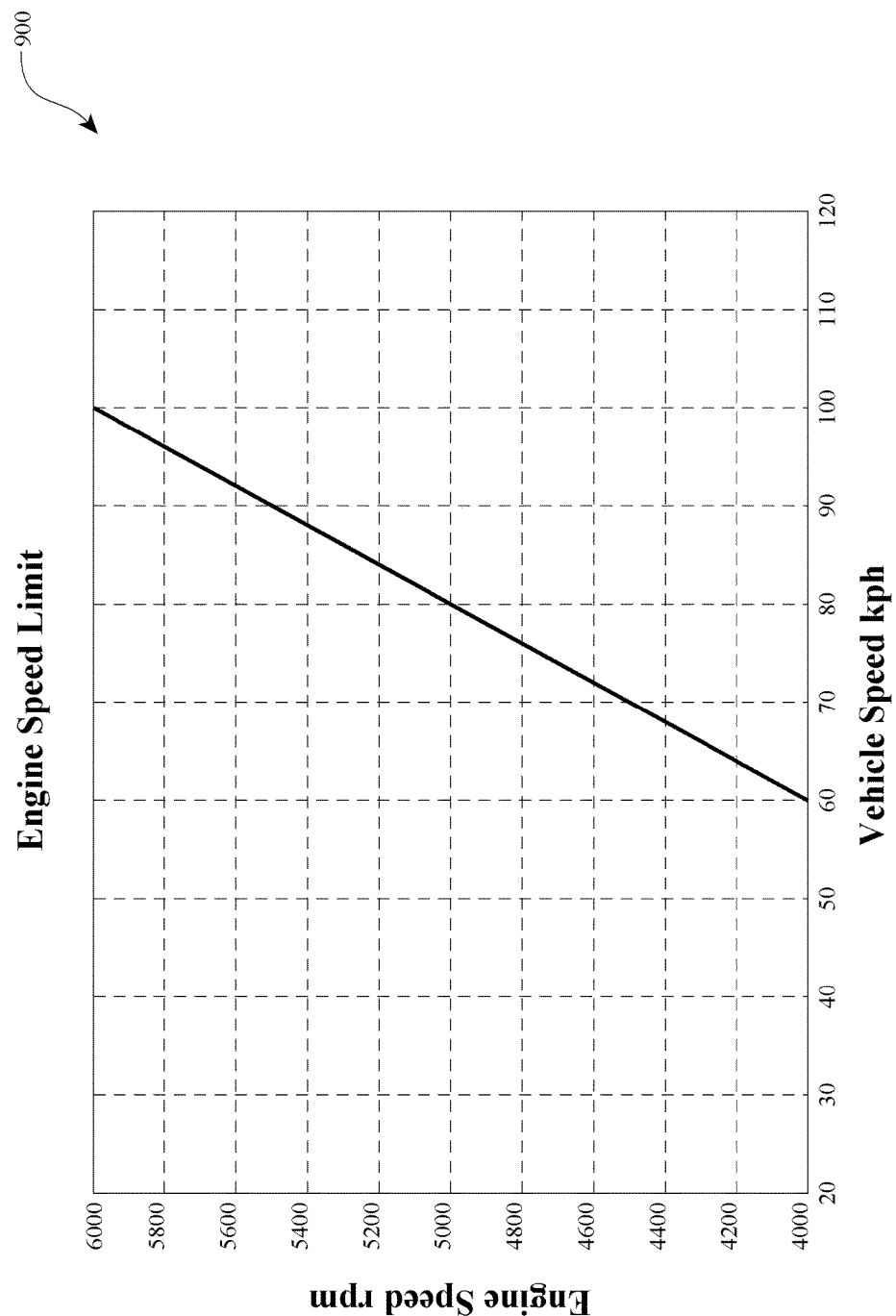
FIG. 9 is a simplified diagram of an embodiment of an engine speed limit map implemented by an electronic controller.

FIG. 9 is a simplified diagram of an embodiment of an engine speed limit map 900 implemented by an electronic controller. The electronic controller may implement an engine speed limit that is based on vehicle speed in order to limit or otherwise prevent engine damage that may occur as a result of exceeding reasonable engine speed limits.

In the embodiment of FIG. 9, the engine speed limit map 900 is implemented in a look up table and is used by the controller to control the engine speed, for example, by providing feedback to an engine control module. An example of the type of information included in the look up table is provided below.

| | | | |
|---|---|---|---|
| Veh_limit = [20 40 60 80 100 120] | | kph | Vehicle speed for Neset limit |
| Neset_limit = [4000 4000 4000 5000 6000 6000] | | rpm | Neset limit |

Alternatively, the variator control modes indicated in Table 9 can be implemented in each case entirely with engine speed control. That is, although other operating objectives may indicated, such as underdrive, overdrive, or ratio control, those objectives can generally be translated to a desired engine speed in each case. In modes zero, one, and three, out-of-range speeds can be used to force the controls to saturate towards one of the ratio extremes. For modes four through seven, the variator output speed and desired ratio are used to compute the corresponding engine speed. The desired ratio is calibrated as a function of vehicle speed in these cases. The computed engine speed set point can be filtered with a first-order filter in order to prevent control activity that is too abrupt.

$$Neset = \begin{cases} 7000 & \text{Idle} \\ f(\text{throttle, veh\_speed}) & \text{Drive} \\ 500 & \text{Transmission} \\ g_1(\text{veh\_speed}) * N_{var} & \text{Coast} \\ g_2(\text{veh\_speed}) * N_{var} & \text{Manual} \end{cases}$$

Figure 10:
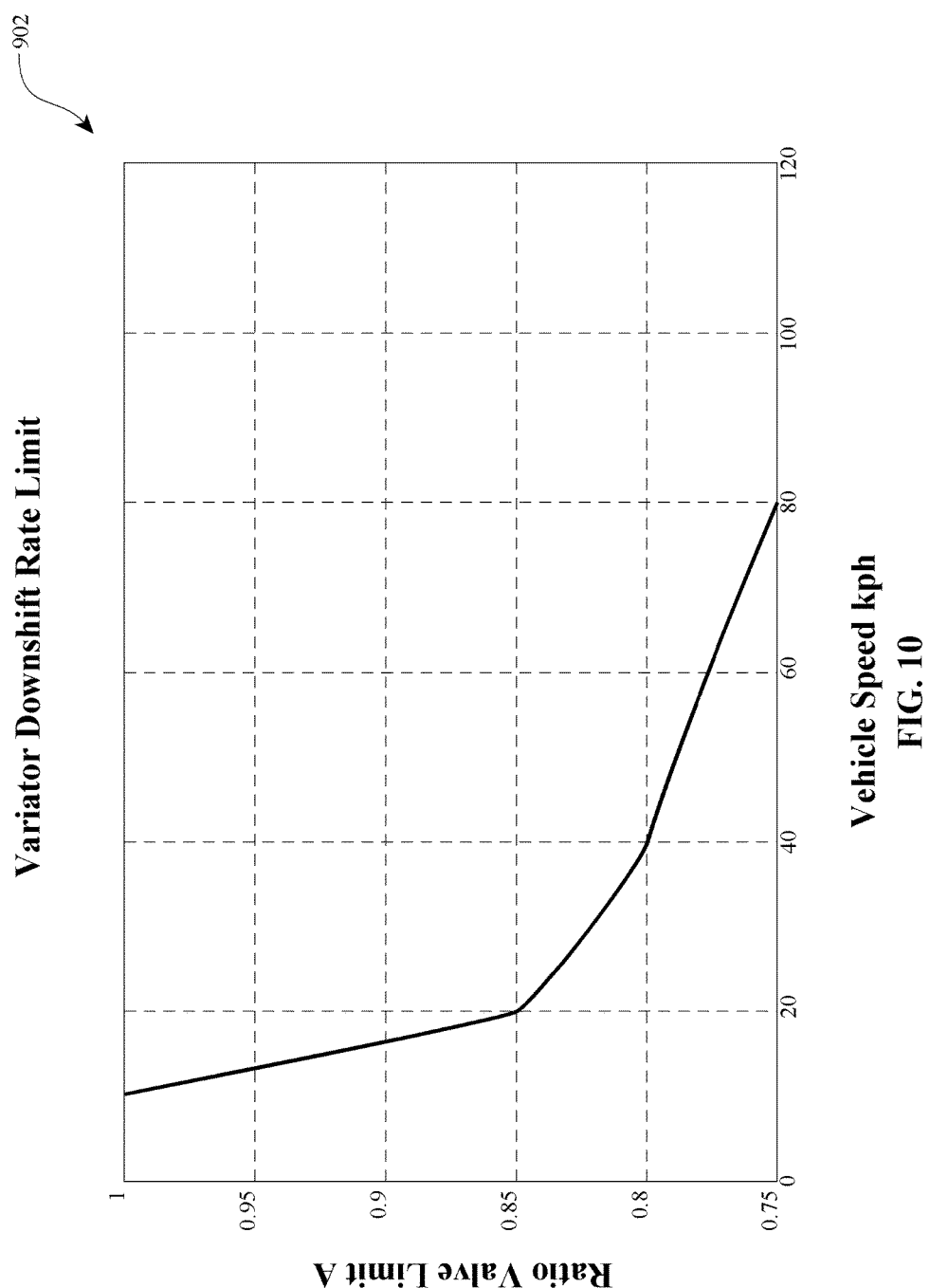
FIG. 10 is a simplified diagram of an embodiment of a variator rate limit map implemented by an electronic controller.

FIG. 10 is a simplified diagram of an embodiment of a variator rate limit map 902 implemented by an electronic controller. Limiting may also be applied to restrict the rate of ratio change in the downshift direction. The limit values of the ratio valve current (iRatioMax and iRatioMin) can be a function of vehicle speed. The rate limit map may be implemented as a look up table. An example of the type of data in the look up table is provided below.

| | | | |
|---|---|---|---|
| iRat0 = 0.7 | | A | null current |
| V_limit = [10 20 40 60 80 100 120] | | kph | vehicle speed for variator valve limit |
| iRsol_limitset = [1 .85 .8 .78 .75 .75 .75] | | A | current limit |

Figure 11:
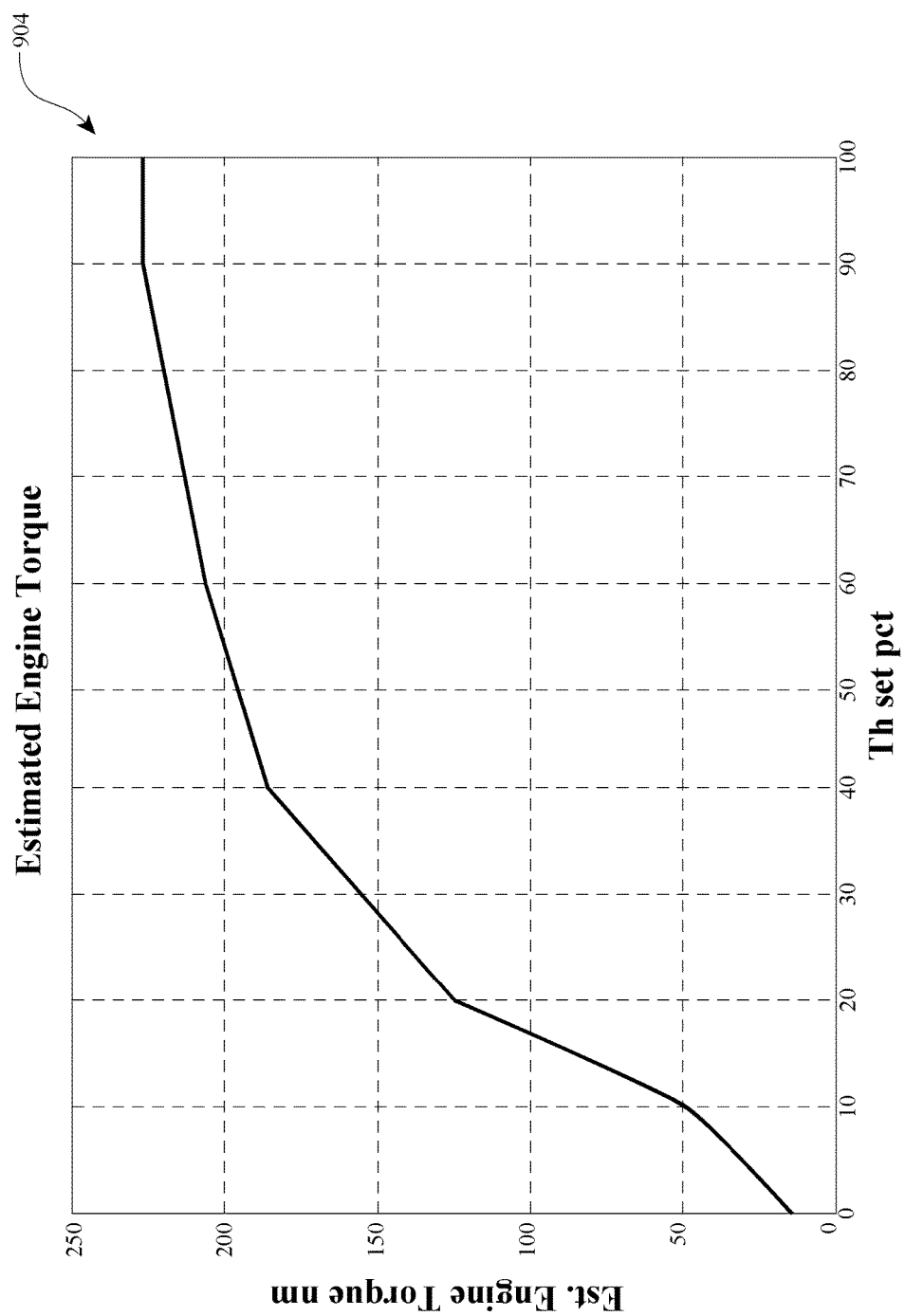
FIG. 11 is a simplified diagram mapping estimated engine torque to throttle position.

FIG. 11 is a simplified diagram 904 mapping estimated engine torque to throttle position. The engine torque map may be predetermined for particular type of prime mover coupled to the transmission. The engine torque map may be stored as a lookup table in memory. The controller 108 can estimate engine torque as a function of throttle. Clutch capacity requirements are computed as a function of engine torque.

The controller can implement transmission range selection according to the logic of Table 8, which may be implemented in the shift logic illustrated in FIG. 4.

TABLE 8

Shift Control Logic

| | Clutch Capacity | | | | |
|---|---|---|---|---|---|
| Operating Mode | Reverse | Forward | Direct | Manual Low | Variator Control |
| Park | | | | | Underdrive |
| Reverse | TfCR | | | | Underdrive |
| Neutral | | | | | Hold |
| Drive   ngear = 1 | | TfCL | | | Underdrive |

TABLE 8-continued

Shift Control Logic

| | Clutch Capacity | | | | |
|---|---|---|---|---|---|
| Operating Mode | Reverse | Forward | Direct | Manual Low | Variator Control |
| ngear = 2 | | TfCL | | | Enable |
| ngear = 3 | | TfCL | TfCH | | Overdrive |
| Low   ngear = 1 | | TfCL | | TfCL | Underdrive |
| ngear = 2 | | TfCL | | TfCL | Enable |

TABLE 9

Solenoid Control Logic

| | | Solenoid Excitation | | | | | |
|---|---|---|---|---|---|---|---|
| Operating Mode | | SHIFT | SEQ | REV | LOW | DIR | RATIO |
| Park | | 0 | 0 | 1 | 1 | 0 | 1 |
| Reverse | | 0 | 0 | 0 | 1 | 0 | 1 |
| Neutral | | 0 | 0 | 1 | 1 | 0 | C |
| Drive | ngear = 1 | 0 | 0 | 1 | 0 | 0 | 1 |
| | ngear = 2 | 0 | 0 | 1 | 0 | 0 | C |
| | ngear = 3 | 0 | 0 | 1 | 0 | 1 | 0 |
| Low | ngear = 1 | 1 | 1 | 1 | 0 | 0 | 1 |
| | ngear = 2 | 1 | 1 | 1 | 0 | 0 | C |

The controller can, for example, implement the modes in the shift control logic of Table 8 using the following pseudocode, where the parameters Vrev and Vmanlow are constants that represent vehicle speed thresholds, above which the controller inhibits the corresponding shift.

```
if lever is in Park or Neutral
    release all clutches
if lever is shifted to Reverse
    if Vkph ≤ Vrev
        apply Reverse clutch
    else
        inhibit reverse range until Vkph ≤Vrev, then apply clutch
if lever is shifted to Drive
    from Park, Reverse or Neutral (with ngear < 3)
        apply Forward clutch
    from Low
        keep Forward clutch locked and release Manual Low clutch
    from Neutral with ngear = 3
        apply Direct clutch, then lock Forward clutch
if lever is shifted to Low
    from Park or Reverse
        apply Manual Low clutch, then lock Forward clutch
    from Drive or Neutral
        if Vkph > VmanLow
            inhibit shift
        else if powered with one-way holding
            lock Manual Low clutch and keep Forward clutch locked
        else
            apply Manual Low clutch, then lock Forward clutch
if lever is in Drive
    if an upshift to ngear = 3 is detected
        apply Direct clutch to shift off one-way (Forward clutch locked)
    if a downshift to ngear < 3 is detected
        release Direct clutch and keep Forward locked so one-way holds
```

The controller can determine the application of the various clutches based on the shift control logic and can implement the logic by selectively enabling or disabling current applied to control solenoids. For example, the controller can implement the logic of Table 8 by setting the solenoid outputs according to the control shown in Table 9. The values indicated in the table represent electrical state, with zero for off and one for on. For the modulated solenoids (reverse, low and direct) the value indicates a steady-state value. In the case of the ratio solenoid, the letter C indicates that the solenoid is controlled to achieve the speed or ratio objective described in the portion describing variator control.

As described above in relation to the fluid flow diagram of FIG. 3C, the fluid line pressure provided by the pump may be dynamically regulated or otherwise dynamically controlled by the controller to enable particular transmission performance in each of the various operating modes.

Figure 12:
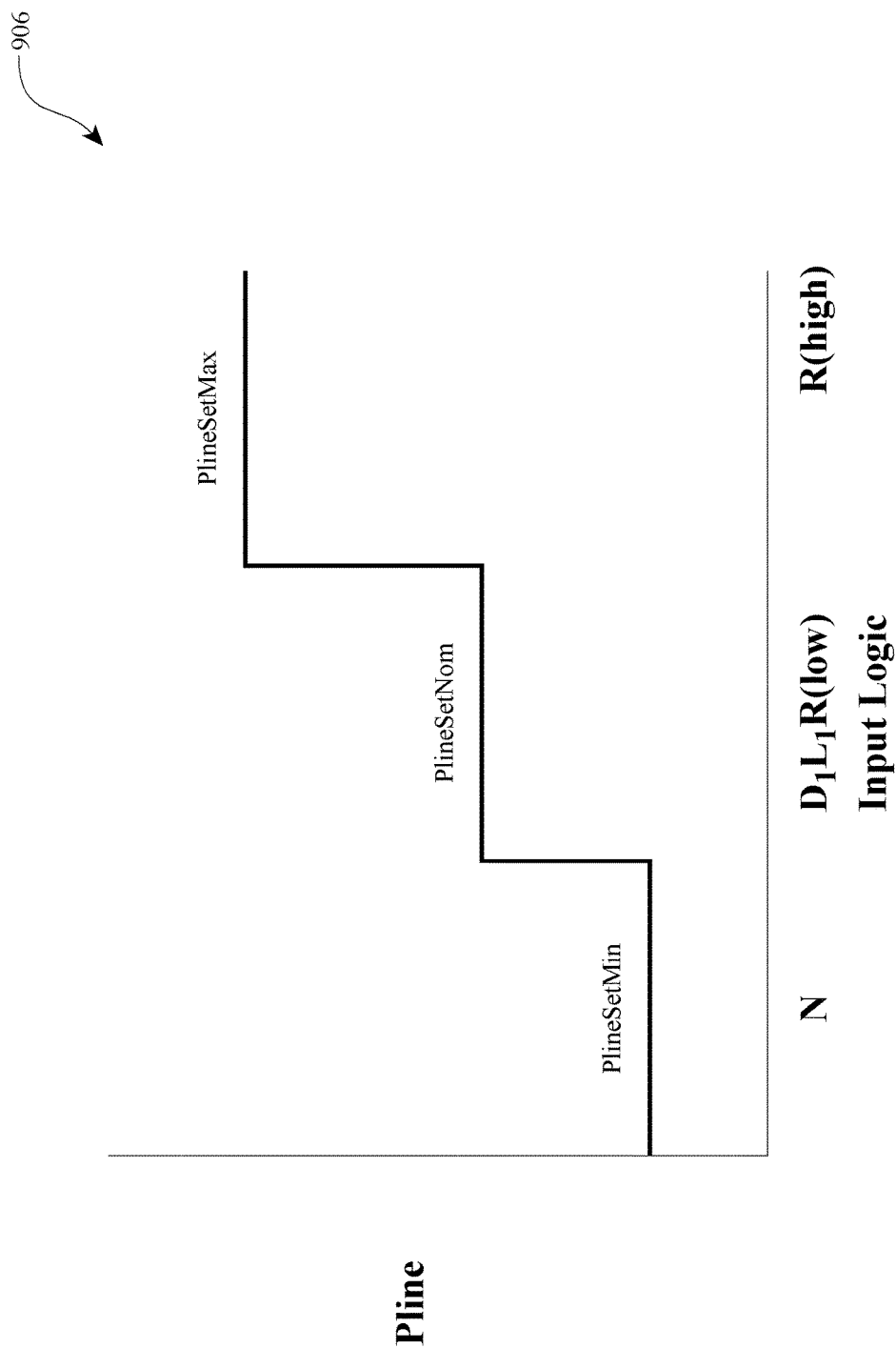
FIG. 12 is a simplified diagram of an embodiment of a line pressure schedule.

FIG. 12 is a simplified diagram of an embodiment of a line pressure schedule 906. The line controller can dynamically regulate the line pressure to a plurality of levels that can map to the various transmission operating modes. As shown in the line pressure schedule 906 of FIG. 12, the controller can control a solenoid or other pressure regulator to achieve three distinct line pressures. A first lowest line pressure can be implemented when the transmission is selected to be in neutral or park. A second intermediate line pressure can be used when the transmission is selected to be in drive or low. A third highest line pressure can be sued when the transmission is selected to be in reverse. Examples of the values for the line pressures are provided below.

| | | |
|---|---|---|
| Plinemin = 6.8e5 | n/m^2 | min line pressure |
| LineSF = 1.25 | | safety factor for minimum line pressure |
| PlineSetMin = 8.5e5 | n/m^2 | lowest setpoint |
| PlineSetNom = 13.6e5 | n/m^2 | nominal line pressure |
| PlineSetMax = 22e5 | n/m^2 | maximum line pressure for high torque reverse |
| pLinemset = le5*[6 8 10 12 14 16 18 20 221] | | |
| Ilinem = [1 0.78 0.7 0.63 0.55 0.47 0.37 0.2 0] | | A solenoid valve current amps |

Figure 13:
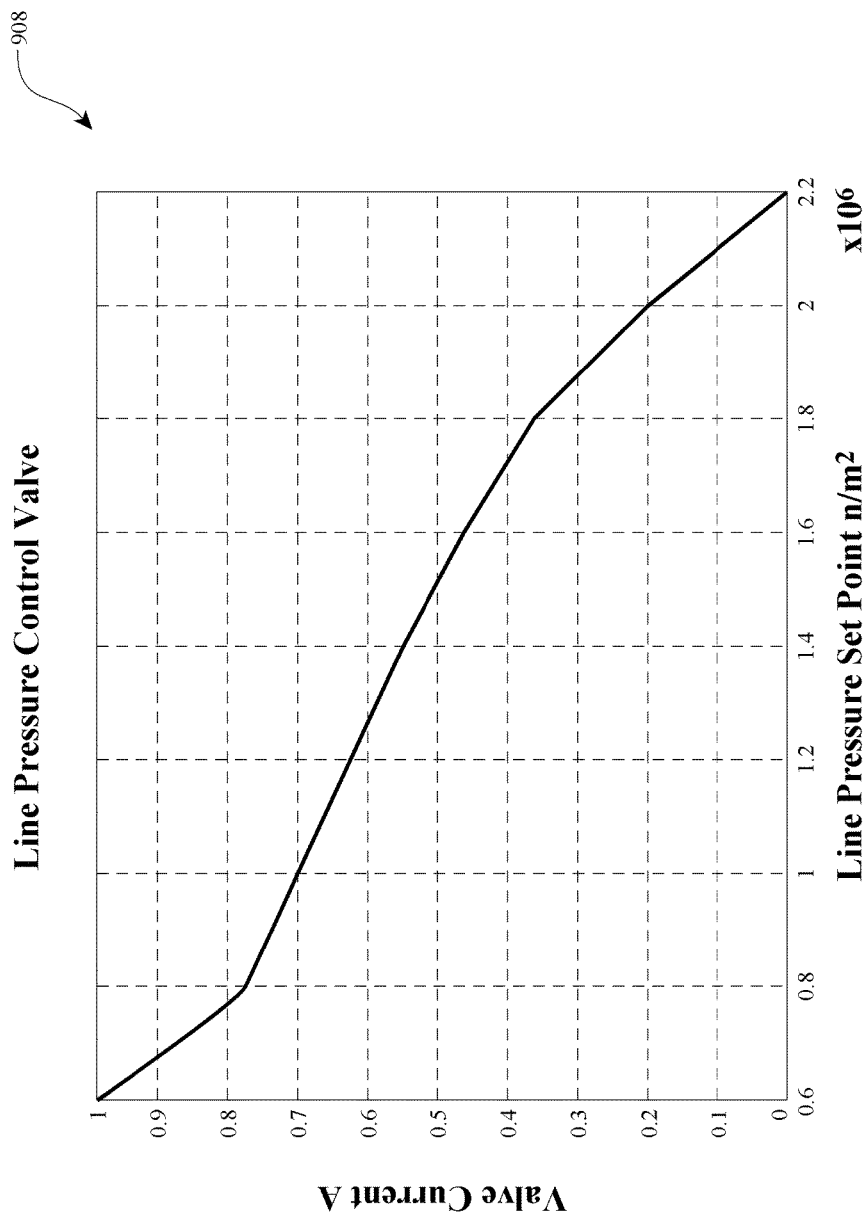
FIG. 13 is a simplified diagram of an embodiment of a line pressure control map.

FIG. 13 is a simplified diagram of an embodiment of a line pressure control map 908. The line pressure control map 908 can be used to calibrate an electronic solenoid used to control the line pressure. In one embodiment, portions of the map may be stored in memory as a lookup table and accessed by the controller to set the line pressure based on the schedule of FIG. 12. Alternatively, only those information corresponding to the desired line pressures in the line pressure schedule of FIG. 12 may be stored in memory for access by the controller.

Figure 14:
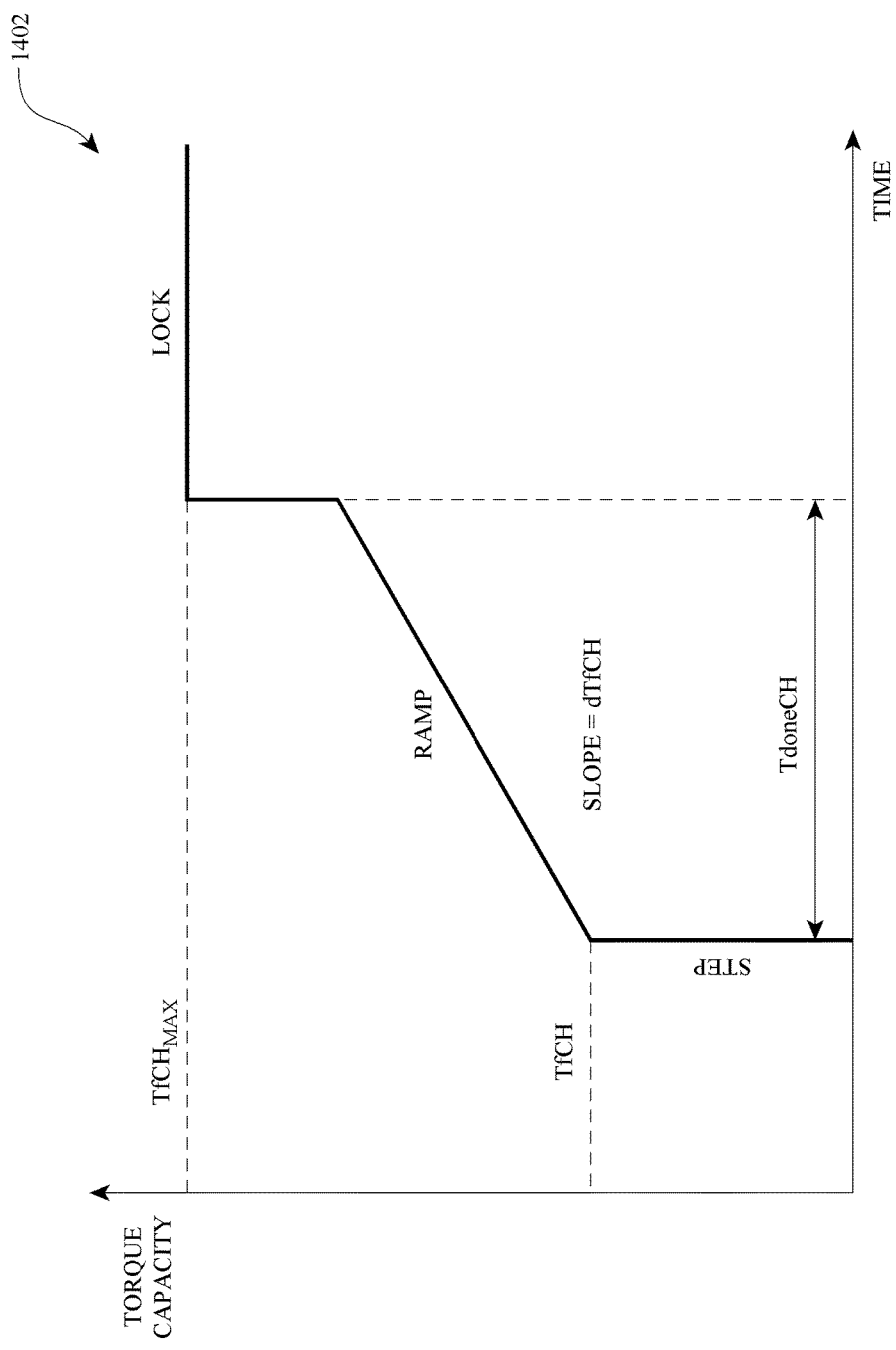
FIG. 14 is a simplified diagram of an embodiment of a clutch application profile.

FIG. 14 is a simplified diagram of an embodiment of a clutch application profile 1402.

The shift quality of an automatic range transmission requires control of the driveline dynamics during the engagement and disengagement of clutches during gear ratio changes. The main performance criteria are a smooth shift with good clutch durability. Shift quality of a shift is based on the application of hydraulic pressure to the clutch in both amplitude and timing. This control system has several parameters that can be adjusted to modulate the hydraulic pressure and therefore the resultant clutch torque.

The clutch apply torque set point profile 1402, as shown in FIG. 14, is based on a number of calibration parameters. The required clutch torque must balance the static input torque to the range box in addition to dynamic torque required to synchronize the clutch. As an example, for an upshift the torque clutch set point is based on the following parameters:

$$Tfc = Kcratio*Tinest + Kcratio\ Ie*(Ne0-Ne1)/tshift$$

Where:
Kcratio=torque ratio clutch to input
Ie=engine inertia
Ne=engine speed
Tshift=shift time In order to simplify the shift quality calibration the required clutch setpoint uses a step input based on a single coefficient and an estimated range box input torque. A low rate torque ramp can be used for fine-tuning.

Note that, in addition to the value of the step, TfCH, defined in FIG. 14, there are three calibration parameters associated with the application.

dTfCH=slope of torque ramp, Nm/sec
TdoneCH=duration of ramp, sec
TfCHmax=maximum torque for lockup The examples provided are applicable for control of the direct clutch in the transmission of FIG. 2. Similar parameters can also be defined for the reverse and low clutches.

The main parameter used for shift quality calibration is the step coefficient Kcxx. The larger the coefficient value, the shorter the shift. A shorter shift causes a greater driveline disturbance.

| Forward clutch/manual | | |
|---|---|---|
| TfCLmax = 540 | nm | max torque |
| Kcls310 = 2.0 | nm/nm | drive 1st gear |
| Kclp400 = 1.15 | nm/nm | manual low |
| dTfCL = 1 0 | nm/sec | torque ramp |
| TdoneCL = 2.0 | sec | timer for max torque series |
| Tmandone = 2.0 | sec | timer for max torque manual |
| Reverse clutch | | |
| TfCRmax = 1600 | nm | max torque |
| Kcrl00 = 8 | nm/nm | |
| Kcrl01 = 16 | nm/nm | |
| dTfCR = 200 | nm/sec | |
| TdoneCR = 5 | | |
| Direct clutch | | |
| TfCHmax = 400 | | |
| Kch330 = 0.45 | | |
| dTfCH = 20 | | |
| TdoneCH = 5 | | |

Figure 15:
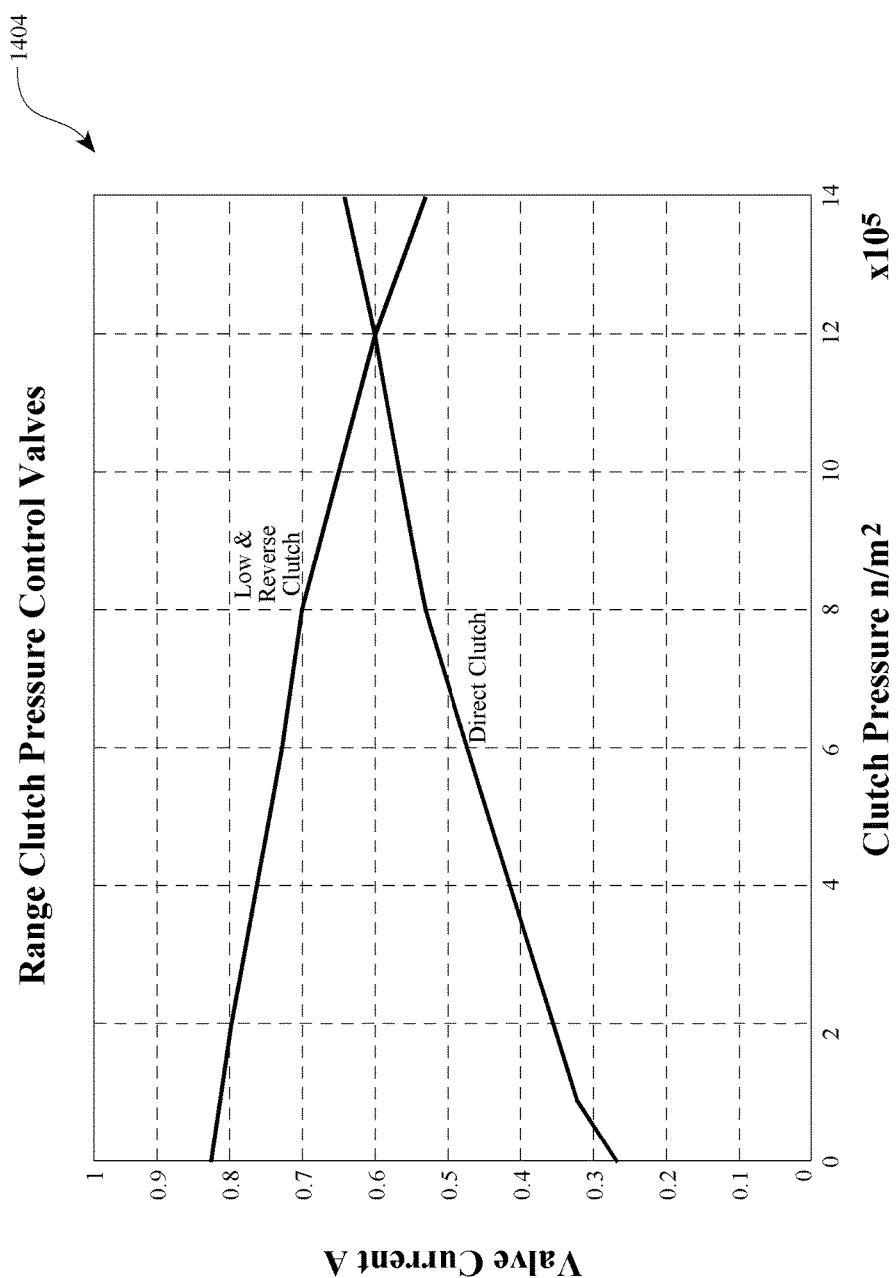
FIG. 15 is a simplified diagram of an embodiment of a clutch pressure control map.

The hydraulic pressure needed to engage the clutch is based on the required clutch torque and clutch characteristics. FIG. 15 is a simplified diagram of an embodiment of a clutch pressure control map 1404. The controller, and in particular the shift quality control module, can store one or more clutch pressure control map 1404 as a look up table in memory. The shift quality control module can access the clutch pressure control map to implement the shift quality as provided in the clutch apply torque set point profile of FIG. 14.

Although the controller can control the operation of the lockup clutch in the torque converter as an additional control range, the engagement and disengagement of the torque converter lockup clutch need not be controlled to the same extent as, for example, the direct clutch used to engage the ranges of the range box. The controller typically applies the lockup clutch in conditions where the torque converter is operating near 100% efficiency, and thus, the transition to a lockup condition does not result in as great a transition as occurs when shifting the range provided by the range box.

Figure 16:
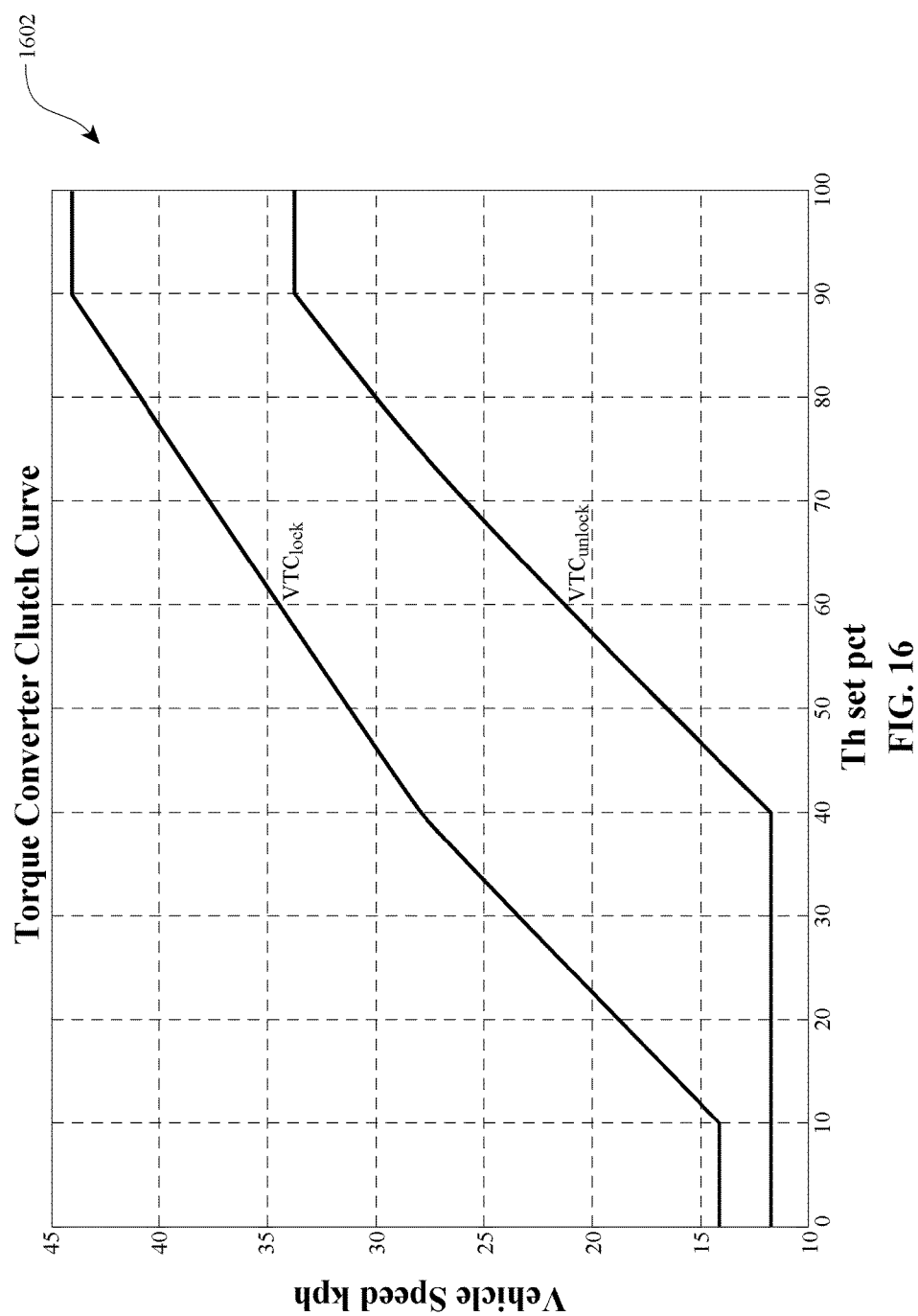
FIG. 16 is a simplified diagram of an embodiment of a torque converter clutch curve.

FIG. 16 is a simplified diagram of an embodiment of a torque converter clutch curve 1602. The controller applies the torque converter clutch according to logic that is similar to the control range selection described above. The controller can lock the torque converter clutch at low speed with light throttle for efficiency. As the driver steps into the throttle as sensed by the percentage of the throttle position sensor, the controller unlocks the clutch to allow the converter to multiply torque.

Torque converter lockup can be inhibited at low oil temperature in order to allow losses in the fluid coupling to heat the oil. Furthermore, the converter can remain locked at excessive temperature in order to prevent the generation of further heat.

The torque converter clutch control strategy is based on the criteria of minimum operation in the unlocked open converter phase. The conditions for open converter are to provide good launch and enhance shift quality. The controller can store the parameters of the torque converter clutch curve in memory. An example of stored parameters is provided below.

| | | |
|---|---|---|
| Th_settcc = [0 10 20 40 60 90 91 100] | pct | throttle angle |
| VTClock = [14 14 18 28 34 44 44 44] | kph | Torque converter lock up |
| VTCunlock = [12 12 12 12 22 34 34 34] | kph | Torque converter unlock |

A controller can thus be configured according to the various embodiments and features described herein to control a transmission, and in particular, a transmission having at least one substantially continuously variable ratio portion, such as a variator, CVT or IVT. The examples described above use an example transmission having a variator in combination with a two-speed range box. In the process of controlling the transmission, the controller executes various strategies and processes that permit transmission operation to be optimized over various conditions and corresponding criteria.

Figure 17:
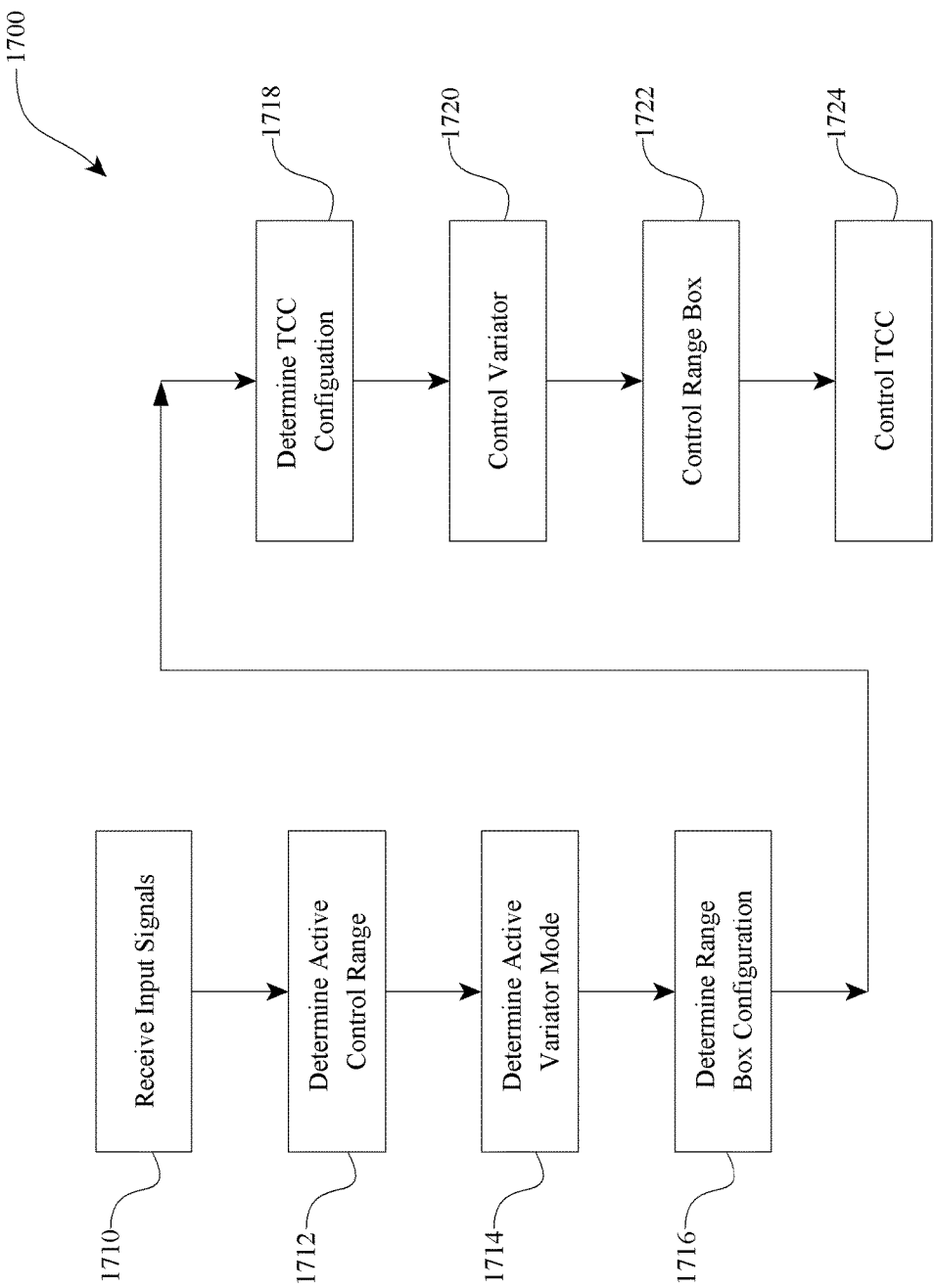
FIG. 17 is a simplified flow chart of an embodiment of a method of controlling a variable ratio transmission.

FIG. 17 is a simplified flow chart of an embodiment of a method 1700 of controlling a variable ratio transmission. The method 1700 can be implemented, for example, within the controller of FIG. 4 to control the variable ratio transmission of FIGS. 2 and 3A.

The method 1700 begins at block 1710 where the controller, for example at the shift point module and the variator mode module, receives input signals that can include sensor values as well as control input values.

The controller proceeds to block 1712 and determines the active control range based on the input values. For example, the shift point module can determine an active control range from a plurality of control ranges. Each of the control ranges can correspond to a range of transmission ratios. Two or more of the control ranges may include overlapping ratios.

The controller proceeds to block 1714 and the variator mode module determines the active variator mode from a plurality of variator modes. The variator mode module can determine the variator mode based on the input values as well as the active control range or a signal, such as the variator flag, that may be based on the active control range.

The controller proceeds to block 1716 and determines a range box configuration, which can include a range box clutch engagement configuration, a range box ratio, and the like, or some combination thereof.

The controller proceeds to block 1718 and determines the state of a torque converter clutch that can be based on the input signals and the active control range. The controller proceeds to block 1720 and configures the variator based on the mode and input values. The controller proceeds to block 1722 and configures the range box based on its determined configuration. The controller proceeds to block 1724 and configures the torque converter clutch based on whether the controller determines it should be engaged or disengaged.

Figure 18:
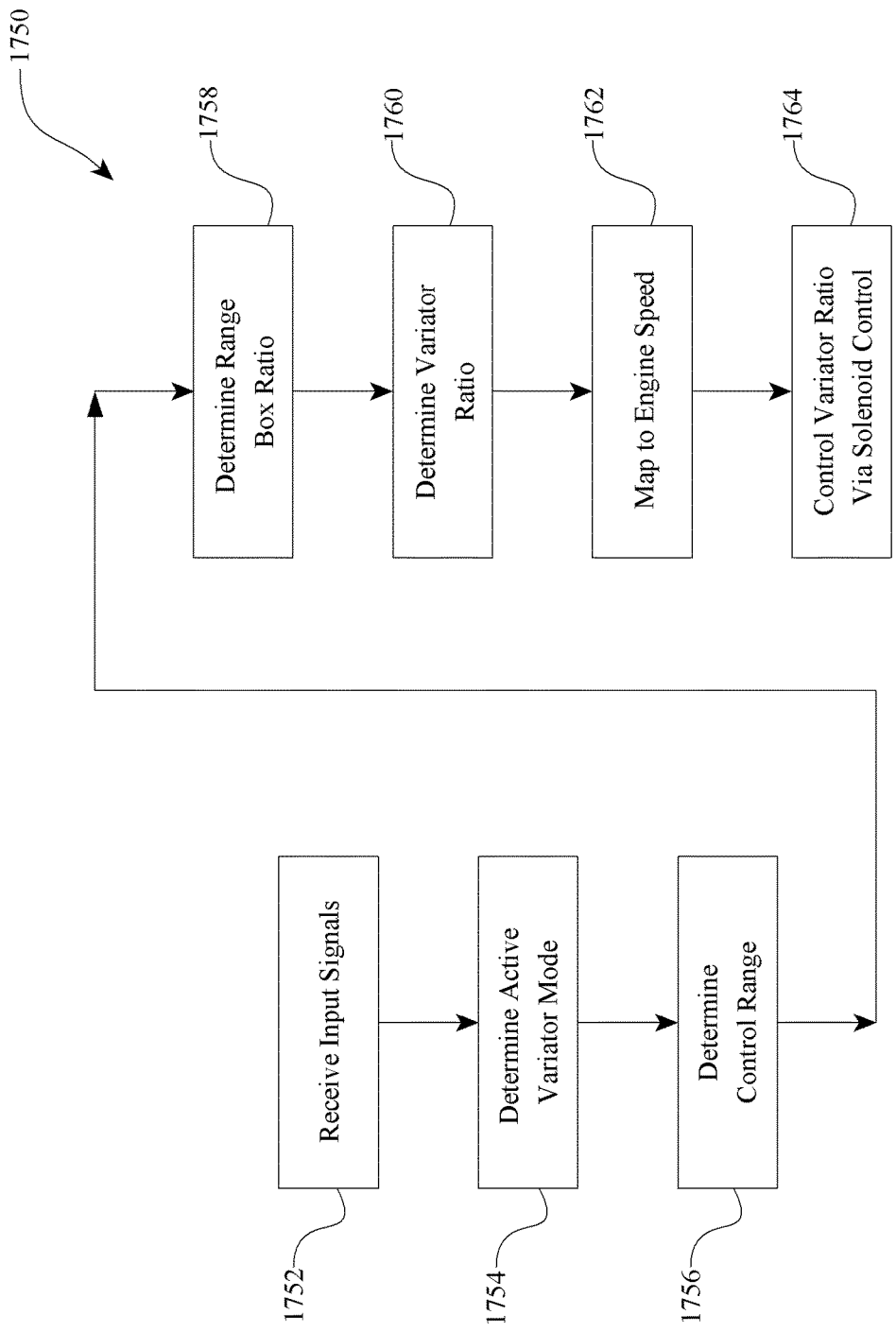
FIG. 18 is a simplified flowchart of an embodiment of a method of controlling a variator in a variable ratio transmission.

FIG. 18 is a simplified flowchart of an embodiment of a method 1750 of controlling a variator in a variable ratio transmission. The method 1750 can be implemented, for example, by the controller of FIG. 4 operating on the transmission of FIGS. 3A-3C.

The method 1750 begins at block 1752 where the controller, for example at the shift point module and the variator mode module, receives input signals that can include sensor values as well as control input values.

The controller proceeds to block 1754 where the shift point module can determine a variator mode based on the inputs. The controller proceeds to block 1756, where the shift point module determines an active control range The controller proceeds to block 1758 where the controller, for example, using the shift point module, determines a range box ratio based on the control range, the input signals, and a shift schedule stored in and accessed from the shift schedule module.

The controller proceeds to block 1760 where the variator mode module can determine a desired variator ratio, for example, based in part on the variator mode. The controller proceeds to block 1762 and the engine speed setpoint module maps the ratio to a target engine speed.

The controller proceeds to block 1764 and controls the variator to achieve the target engine speed. The controller can, for example, utilize a closed loop control module to monitor an engine speed and control a solenoid that controls a position of a longitudinal axis of a rotating planet within the variator in order to achieve the target engine speed.

Figure 19:
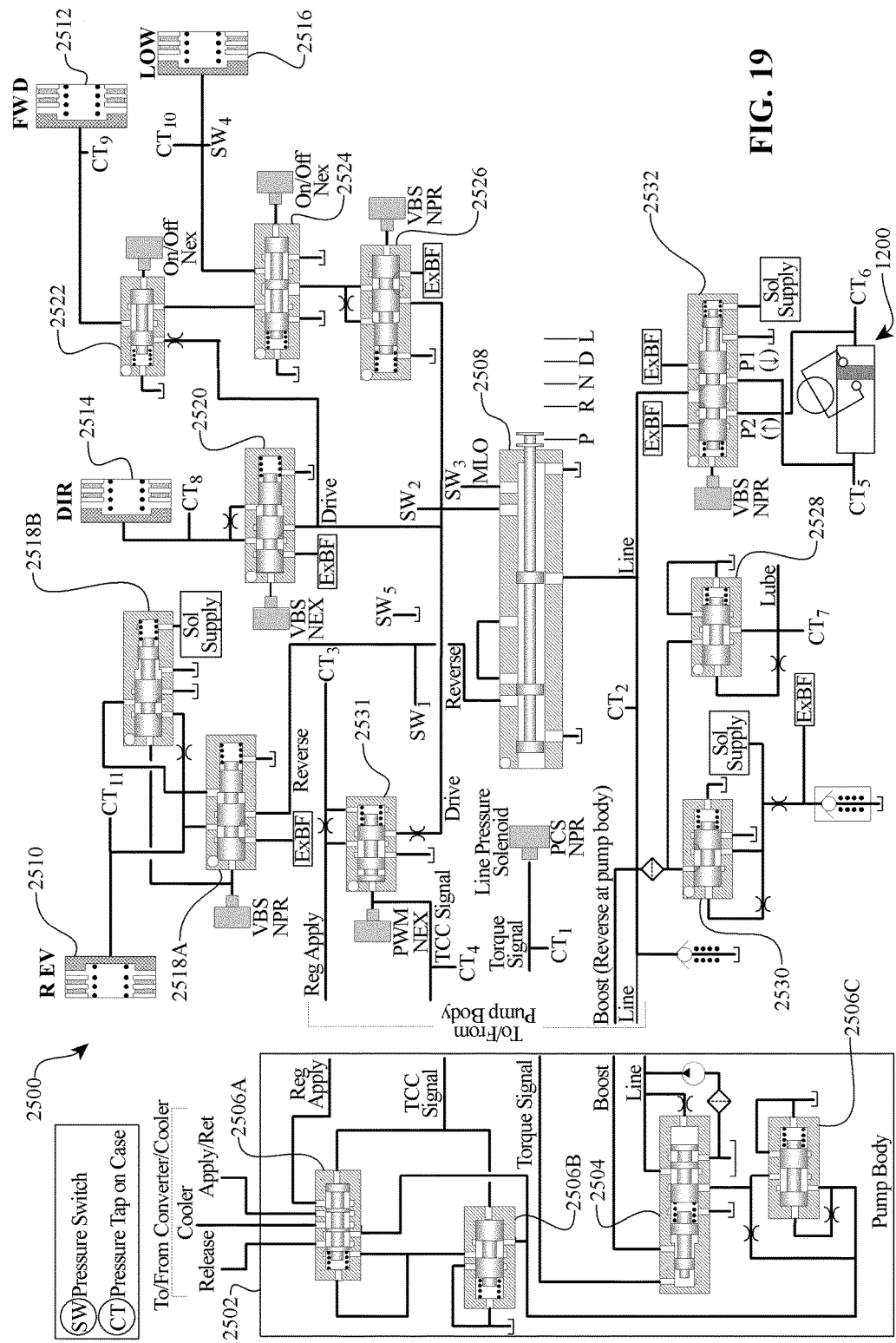
FIG. 19 is a schematic diagram of an embodiment of a fluid flow diagram of an embodiment of a valve system that can be implemented on a variable ratio transmission.

FIG. 19 is a schematic diagram of an embodiment of a fluid flow diagram of an embodiment of a valve system 2500 that can be implemented on a variable ratio transmission such as the transmission 101. The associated hardware represented by the symbols and schematic notations illustrated in FIG. 19 should be readily apparent to those having ordinary skill in the relevant technology. The valve system 2500 can include a pump valve subsystem 2502 configured to be in fluid communication with a number of pressure control valves. In one embodiment, the pump valve subsystem 2502 is adapted to cooperate with a pump 806 (FIG. 3A) provided on the transmission 101. The pump valve subsystem 2502 can include a pressure regulator valve 2504. The pressure regulator valve 2504 controls, among other things, the system pressure of the valve system 2500 (sometimes referred to here as "line pressure"). The pressure regulator valve 2504 is in fluid communication with a number of torque converter control valves 2506A, 2506B, 2506C. The torque converter control valves 2506 are adapted to control the engagement and disengagement of the torque converter 210, for example, among other things.

In one embodiment, the valve system 2500 includes a manual valve 2508 in fluid communication with the pressure regulator valve 2504. The manual valve 2508 can be operably coupled to the PRNDL lever. The manual valve 2508 is adapted to cooperate with, for example, the pressure switch manifold described in reference to Table 4. In one embodiment, the range box 1600 consists of hydraulic friction clutches in communication with the valve system 1500 that govern the engagement and disengagement of each clutch as governed by the control logic. FIG. 19 illustrates the hydraulic connection for each clutch in the range box. A reverse clutch 2510, a forward clutch 2512, a direct clutch 2514, and a manual low clutch 2516 are all engaged and disengaged by hydraulic pressure acting on the face of the clutch. The aforementioned clutches can be substantially similar to the clutches included in the range box 1600. The passage of pressurized fluid to each clutch is achieved through holes in the transmission case, for example, and ports in the valve system 2500. The valve system 2500 can include a set of reverse clutch control valves 2518A and 2518B in fluid communication with the reverse clutch 2510. The valve system 2500 can include a direct clutch control valve 2520 in fluid communication with the direct clutch 2514. The valve system 2500 can include a forward clutch control valve 2522 in fluid communication with the forward clutch 2512. The valve system 2500 can include a manual low clutch control valve 2524 in fluid communication with the manual low clutch 2516. The manual low clutch control valve 2524 is configured to be in fluid communication with the forward clutch control valve 2522. In one embodiment, the valve system 2500 includes a clutch regulator valve 2526 configured to regulator pressure supplied to the manual low clutch control valve 2524. Each of the control valves can be adapted to cooperate with electrohydraulic solenoids as indicated in Table 2, for example.

In one embodiment, the manual valve 2508 is used to direct line pressure to the appropriate collection of valves for range box control. When "P" or "N" is selected, the manual valve moves to a position that blocks line pressure to all clutch control valves. When "R" is selected, the manual valve moves to a position that directs line pressure to the reverse clutch control valves 2518. The selection of "D" or "L" moves the manual valve to a position that directs line pressure to control valves for the direct clutch 2514, the forward clutch 2512, and the manual low clutch 2516.

In one embodiment, the selection of "D" or "L" enables the coordination of the direct clutch 2514, the forward clutch 2512, and the manual low clutch 2516 as governed by the control logic. The forward clutch 2512 and the manual low clutch 2516 are controlled with the forward clutch control valve 2522 ("Fwd Sequence Valve" in FIG. 19), the manual low clutch control valve 2524 ("Fwd/Man Shift Valve" in FIG. 19), and the clutch regulator valve 2526 ("Fwd/Man (Low) Reg Valve" in FIG. 19). The forward clutch control valve 2522 and the low clutch control valve 2524 are directional control valves in communication with normally exhausted On/Off solenoids.

In one embodiment, the selection of "R" moves the manual valve to a position that directs line pressure to the reverse clutch control valves 1518. The reverse clutch control valves can include two pressure regulators valves, a passive valve 2518B and an active valve 2518A. The active valve 2518A ("Reverse Reg Valve" in FIG. 19) is in communication with the control system through a normally pressurized variable bleed solenoid. The regulated pressure is directed from the active valve 2518A to the reverse clutch 2510 and to the passive valve 2518B ("reverse boost valve" in FIG. 19). The reverse clutch pressure is exhausted when the manual valve selection is changed from "R" and the control logic coordinates the appropriate solenoid commands.

In one embodiment the valve system 2500 includes a lube pressure regulator 2528 configured to be in communication with the line pressure and a lubrication system of the transmission 101, for example. Lube system pressure is regulated either with a passive pressure regulator or actively controlled with a solenoid in the same manner as the main pressure regulator. The valve system 2500 can include a solenoid pressure regulator 2530 configured to be in fluid communication with the line pressure. The solenoid pressure regulator 2530 supplies pressurized fluid to a number of solenoids in the valve system 2500. In one embodiment, the valve system 2500 includes a torque converter regulator valve 2531 configured to be in fluid communication with the torque converter control valves 2506. The valve system 2500 includes a ratio control valve 2532 configured to cooperate with the variator 1200, for example. In one embodiment, the ratio control valve 2532 is an open-center pressure control valve.

The controller is not limited to controlling the transmission, but can also serve to provide diagnostic information based on the various input signals provided to the controller. The controller can be configured to control the transmission when detecting failure modes to prevent catastrophic failure of the transmission and to permit limited operation in failure modes.

Electrical failures can be broken down into two categories: loss of power and controller crash. A reasonable recovery of operation, perhaps with reduced function, is typically possible in both cases.

In the case of complete loss of electric power, all solenoids will operate with zero current. The internal pressures controlled by the solenoids will revert to default pressure states. The hydraulic system within the transmission can be designed so that this represents a usable "limp home" mode. The variator can default to full overdrive and the torque converter can default to an unlocked condition. The range box state can depend on the PRNDL position, and can operate, for example, in under driver control. In Drive the default range is Low and in Reverse, Reverse. This facilitates vehicle launch and driving at reasonable speed. Furthermore, if the failure occurs at high vehicle speed, the one-way clutch can overrun to prevent excessive engine speed.

Although the controller circuits are designed to be highly robust, the remote chance of loss of control can be addressed with a watchdog timer. This is an internal circuit that requires periodic timer resets during normal operation. If the controller program hangs up and doesn't perform the reset within the prescribed interval, the timer resets the controller system. This allows the controller to come back on line and maintain control of the system.

Two general classes of hydraulic failure modes may be addressed. These classes include loss of pressure and excessive backpressure.

Unexpectedly low pressure can be detected in two ways. The controller can directly measure or otherwise receive signals indicative of various system pressure levels and can compared the values to expected ranges. Even without the direct measurement of pressure, loss of pressure may lead to excessive clutch slip as indicated by speed inputs. In either case, excessive clutch slip will deteriorate friction plates and low variator pressure will lead to loss of control.

The prescribed countermeasure for this condition is to place the transmission in neutral by releasing all clutches. This removes all load from the friction plates and the variator. Although the vehicle can not be driven in this condition, potentially destructive component wear is prevented. An indication to the driver of transmission failure may also be given.

The controller can measure or otherwise monitor the lube pressure an input variable. In the event that lube pressure is lost or unexpectedly low, a destructive situation is imminent. In this case the transmission will immediately shift to neutral so that no components will need to carry power. The controller can illuminate the diagnostic lamp.

If a clutch pack is released but residual pressure is trapped, undesirable clutch drag will result. Again, this can be detected via monitoring pressure or speed. The safest response to this condition is to alert the driver to stop the vehicle.

Two temperature sensors may be implemented in the controller system. The first monitors the sump oil to indicate the mean fluid temperature. The second is located in the variator to sense the temperature of the traction fluid splashing on the ball (planet) contact patches.

Temperature extremes in the variator coolant are a sign of impending catastrophic failure. If this condition is detected the transmission will be immediately placed in neutral by releasing all clutches. This unloads the variator and minimizes any further potentially destructive contact patch slip power. Although the vehicle cannot be driven, failing to this condition is the safest compromise and prevents further wear.

Low fluid temperature increases viscosity, restricting flow in some circuits. This is not considered to be a failure but it can potentially compromise performance. Below a calibrated threshold, the control system can heat the oil to a reasonable working temperature by preventing torque converter clutch lockup.

High fluid temperature can accelerate degradation of friction and traction properties. Above a calibrated threshold, the converter of a moving vehicle can be controlled to always run locked in order to reduce further heating. If the temperature continues to rise a warning light will alert the driver.

System speed measurements allow the computation of slip across each friction clutch. If slip is detected in cases where the clutch is known to be applied with a high safety factor, it will be judged that the friction material has degraded substantially. The driver will be alerted to the error and the clutch will be opened to prevent further damage and excessive heating.

An input can be provided to the controller to measure the variator servo position. The ring contact radii can be computed from this information, hence the mechanical ratio of the ball variator. This can be compared to the speed ratio in order to determine the slip at the ring contact patches. If the slip is determined to be above a calibrated threshold the variator is unloaded to prevent potential damage. As in the case of high variator lube temperature, this is achieved by shifting the transmission to neutral, resulting in a loss of vehicle power.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, controller, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine.

A controller or processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module as one or more programmable instructions to be executed by a processor, data, or information encoded onto a processor or computer readable media and executed by a processor or computer, or in a combination of the two.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of controlling a variable ratio transmission in a drivetrain having a ball planetary type variator, the drivetrain having at least two forward modes, a reverse mode, and one of a neutral mode and a park mode, the method comprising:
    storing, in a shift schedule module, a shift schedule map;
    receiving, by a shift point module, a plurality of input signals, wherein the plurality of input signals includes an engine parameter and a transmission ratio;
    determining an active control range from a plurality of control ranges based at least in part on the plurality of input signals and the shift schedule map, wherein each control range corresponds to a range of transmission ratios;
    configuring a range box into one of the at least two forward modes, the reverse mode, and the neutral mode or the park mode;
    determining an active variator mode from a plurality of variator modes based on the plurality of input signals and the active control range, wherein at least one variator mode includes a 1:1 ratio; and
    controlling an operation of the variator based on the input signals and the active variator mode.

2. The method of claim 1, further comprising controlling actuation of a clutch to activate the configuration of the range box.

3. The method of claim 1, further comprising controlling the range box to provide a gear ratio based on the configuration of the range box.

4. The method of claim 1, further comprising:
    determining a configuration of a torque converter clutch corresponding to a torque converter that couples power from a prime mover to the variator; and
    selectively engaging the torque converter clutch based on the configuration of the torque converter clutch.

5. The method of claim 1, wherein receiving the plurality of input signals comprises receiving at least one sensor value and at least one control state.

6. The method of claim 1, wherein receiving the plurality of input signals comprises receiving a throttle position sensor input value and a gear selector value.

7. The method of claim 1, wherein determining the active control range comprises:
retrieving at least a portion of a shift curve; and
determining the active control range based on the portion of the shift curve and the plurality of input signals.

8. The method of claim 7, wherein the plurality of input signals comprises:
a throttle position sensor value; and
a vehicle speed value.

9. The method of claim 1, wherein controlling the operation of the variator comprises modulating a current applied to an electronic solenoid to control a ratio of the variator.

10. The method of claim 1, wherein controlling the operation of the variator comprises controlling the variator to provide a ratio from a range of ratios that spans an underdrive ratio and an overdrive ratio.

11. The method of claim 1, wherein controlling the operation of the variator comprises controlling a longitudinal axis of a rotating planet within the variator.

12. The method of claim 11, wherein controlling the longitudinal axis comprises controlling a position of a shift lever coupled to the rotating planet by modulating a current applied to a control solenoid.

13. A controller system for controlling a variable ration transmission in a drivetrain having a ball planetary type variator, the drivetrain having at least two forward modes, a reverse mode, and one of a neutral mode and a park mode, the controller system comprising:
a controller including a plurality of modules comprising:
a shift schedule module configured to store a shift schedule map on a computer readable medium;
a shift point module communicatively coupled to the shift schedule module and the computer readable medium, the shift point module configured to:
receive a plurality of electronic input signals from one or more sensors, wherein the plurality of electronic input signals includes an engine parameter and a transmission ratio,
determine an active control range from a plurality of control ranges based at least in part on the plurality of electronic input signals and the shift schedule map, and wherein each control range corresponds to a range of transmission ratios, and
configure a range box into one of the at least two forward modes, the reverse mode, and the neutral mode or the park mode;
a variator mode module configured to receive the plurality of electronic input signals and the active control range and determine a variator mode based on the plurality of electronic input signals and the active control range, wherein at least one variator mode includes a 1:1 ratio; and
a control module configured to control a ratio of a variator based on the variator mode,
wherein each of the shift schedule module, the shift point module, the variator mode module, and the control module are embodied on one or more of an application specific integrated circuit, at least one processor circuit, or software stored on a computer readable medium and configured to be executed by a processor.

14. The controller system of claim 13, wherein the controller further comprises a shift logic module communicatively coupled to the shift point module and configured to receive the active control range from the shift point module, wherein the shift point module is configured to determine a state of an upshift flag and a downshift flag based on the plurality of electronic input signals, and wherein the shift logic module is configured to control engagement of at least one clutch controlling a ratio of the range box coupled to the variator.

15. The controller system of claim 14, wherein the controller further comprises a shift quality control module coupled to the shift logic module and configured to control an electronic solenoid to control engagement of the at least one clutch, wherein the shift quality control module is configured to determine an application rate and a corresponding solenoid current.

16. The controller system of claim 13, wherein the controller further comprises an engine speed setpoint module communicatively coupled to the variator mode module and configured to determine an engine speed setpoint value based on the variator mode, and wherein the control module is configured to receive an engine speed value and is configured to control the ratio of the variator based on the engine speed value and the engine speed setpoint.

* * * * *